(12) United States Patent
Gullicksen

(10) Patent No.: US 10,291,609 B2
(45) Date of Patent: May 14, 2019

(54) VAULT APPLIANCE FOR IDENTITY VERIFICATION AND SECURE DISPATCH OF RIGHTS

(71) Applicant: Gullicksen Brothers, LLC, Campbell, CA (US)

(72) Inventor: Jeff Gullicksen, Mountain View, CA (US)

(73) Assignee: Reavire, Inc., Campbell, CA (US)

(*) Notice: Subject to any disclaimer, the term of this patent is extended or adjusted under 35 U.S.C. 154(b) by 227 days.

(21) Appl. No.: 15/347,551

(22) Filed: Nov. 9, 2016

(65) Prior Publication Data

US 2018/0063119 A1 Mar. 1, 2018

Related U.S. Application Data

(60) Provisional application No. 62/378,486, filed on Aug. 23, 2016.

(51) Int. Cl.
| | | |
|---|---|---|
| H04L 29/06 | (2006.01) | |
| G06F 21/60 | (2013.01) | |
| H04L 29/08 | (2006.01) | |
| H04L 12/28 | (2006.01) | |
| H04L 12/46 | (2006.01) | |
| G06F 21/10 | (2013.01) | |

(52) U.S. Cl.
CPC ............ H04L 63/083 (2013.01); G06F 21/10 (2013.01); G06F 21/606 (2013.01); H04L 12/282 (2013.01); H04L 12/2818 (2013.01); H04L 12/4625 (2013.01); H04L 63/0428 (2013.01); H04L 67/141 (2013.01); H04L 2463/082 (2013.01)

(58) Field of Classification Search
CPC . H04L 63/083; H04L 12/4625; H04L 12/282; H04L 67/141; H04L 63/0428; H04L 12/2818; H04L 2463/082; G06F 21/10; G06F 21/606
See application file for complete search history.

(56) References Cited

U.S. PATENT DOCUMENTS

| 5,917,449 | A | 6/1999 | Sanderford et al. |
| 6,249,680 | B1 | 6/2001 | Wax et al. |
| 8,621,209 | B1 | 12/2013 | Johansson et al. |
| 8,656,473 | B2 | 2/2014 | Hall et al. |

(Continued)

FOREIGN PATENT DOCUMENTS

WO 2014/176539 10/2014

OTHER PUBLICATIONS

International Application No. PCT/US2017/047158 International Search Report and Written Opinion including PCT/ISA/220, PCT/ISA/210, and PCT/ISA/237 to Gullicksen Brothers, LLC, dated Feb. 28, 2018, 30 pages.

(Continued)

*Primary Examiner* — John B King
(74) *Attorney, Agent, or Firm* — BainwoodHuang

(57) ABSTRACT

A technique for promoting network security employs a vault appliance that serves as a local security hub for users and their devices. The vault appliance securely stores user information and definitions of rights, i.e., activities that user devices may perform, and securely dispatches those rights in response to right-requests from devices and subject to verification.

21 Claims, 11 Drawing Sheets

(56) References Cited

U.S. PATENT DOCUMENTS

| | | | |
|---|---|---|---|
| 9,516,503 B2 | 12/2016 | Berns et al. | |
| 2010/0293607 A1* | 11/2010 | Hall | G06F 21/31 |
| | | | 726/8 |
| 2014/0164775 A1* | 6/2014 | Wu | H04L 63/0428 |
| | | | 713/171 |
| 2015/0256337 A1* | 9/2015 | Nguyen | H04W 4/70 |
| | | | 713/171 |
| 2016/0112429 A1* | 4/2016 | Sundaresan | H04L 63/08 |
| | | | 726/4 |
| 2016/0127372 A1 | 5/2016 | Unterschuetz | |
| 2016/0134932 A1* | 5/2016 | Karp | H04W 4/80 |
| | | | 348/155 |
| 2016/0285835 A1* | 9/2016 | Linga | H04L 9/0816 |
| 2016/0323257 A1* | 11/2016 | Kang | H04L 63/08 |
| 2016/0366105 A1* | 12/2016 | Smith | H04L 63/0428 |
| 2017/0039352 A1* | 2/2017 | Volkening | G06F 21/57 |
| 2017/0063843 A1* | 3/2017 | Vijayasankar | H04L 63/0823 |
| 2017/0111337 A1* | 4/2017 | Saboori | H04L 63/06 |
| 2017/0142073 A1* | 5/2017 | Fransen | H04W 4/70 |

OTHER PUBLICATIONS

Domotics: "La HC2 de Fibaro gere aussi les cameras IP"; Dec. 19, 2013; pp. 1-12.

"Fibaro UK Permissions & Access control"; Feb. 2, 2016; 4 pages.

BeyondCorp: A New Approach to Enterprise Security web pages downloaded from https://research.google.com/pubs/pub43231.html.

Google Infrastructure Security Design Overview web pages downloaded from https://cloud.google.com/security/security-design/.

Hardware Security Modules web pages downloaded from https://handouts.secappdev.org/handouts/2010/Filip%20Demaertelaere/HSM.pdf.

* cited by examiner

VAULT APPLIANCE FOR IDENTITY VERIFICATION AND SECURE DISPATCH OF RIGHTS

CROSS-REFERENCES TO RELATED APPLICATIONS

This application claims priority to and benefit of U.S. Provisional Application No. 62/378,486, filed Aug. 23, 2016, the contents and teachings of which are incorporated herein by reference in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

BACKGROUND

1. Field of the Invention

This invention relates generally to computer and network security, and more particularly to a vault appliance that acts as a personal hub for securely storing user information, passwords, encryption keys, and the like, and which is configured with protocols for maintaining a closed overlay network with network-connectable devices within a local environment and among vaults and devices within other environments.

2. Description of Related Art

The Internet was conceived as an open, anonymous, any-to-any communications network. It has since become the foundational global network for communications, transmission of digital content, and control of the Internet of Things (IoT). Because the Internet was not designed to be inherently secure, a large number of point solutions have been developed to address specific vulnerabilities. These include detection and mitigation of network-based attacks, software-based password vaults, browser-based keychains, data protection systems, and mobile device management solutions.

SUMMARY

Unfortunately, the accumulation of disparate point solutions has increased complexity to a point where security problems cannot always be solved. Different applications often have their own security methods and privacy protection, making security difficult for users to understand and opaque even to the well informed. Users may circumvent security to avoid complexity. Further, IT administration of security measures is expensive. Nevertheless, huge investments have been made in existing network paradigms, making a complete redesign impractical. What is needed is a change in the way activities are performed over computer networks that leverages existing network infrastructures and introduces elements that help to promote security at a fundamental level.

In contrast with prior approaches, which have often been ad hoc, expensive, and ineffective, an improved technique for promoting network security employs a vault appliance that serves as a local security hub for users and their devices. The vault appliance stores user information and definitions of "rights," i.e., activities that user devices may perform, and securely dispatches those rights in response to right-requests and subject to user and/or device verification.

In some examples, the vault appliance (or simply, "vault") is a hardware device having an established physical location within a range of a local network. The vault appliance is connected to the local network, through either a wired or wireless connection (preferably wired), and the range of the network forms a local, or "home" region. In an example, the vault is configured to recognize whether a device is located within the home region and to use that information when responding to right-requests. For example, the vault may subject right-requests originating from devices within the home region to less rigorous scrutiny than it does for right-requests originating from outside the home region.

In some examples, the vault supports right definitions in the form of content rights (to access particular content), communication rights (to communicate with another party), and/or action rights (to control a particular element). Rights may be user-defined through secure user interaction with the vault appliance, with the vault appliance storing user-defined right definitions in a uniform rights format. In some examples, users define verification requirements on a per-right basis, such that the criteria that the vault applies in dispatching rights may vary from right to right.

In some examples, the vault dispatches rights subject to a variable verification process. For instance, requirements for verifying a right may include multiple criteria, with each criterion making a contribution to an overall verification strength. If the overall verification strength exceeds a predefined threshold, verification may succeed; otherwise, it may fail. Verification can thus be flexible, with strength of some criteria compensating from weakness in others. In some examples, verification may require that certain criteria be satisfied unconditionally, such that verification will fail if any of those criteria fails to be met, even if overall verification strength exceeds the threshold.

In some examples, the vault appliance may be provided with one or more service modules. Each service module is registered with the vault appliance and is configured to control respective equipment in the home region. Such equipment may include, for example, one or more gaming systems, home or office security components, HVAC (Heating, Ventilation, and Air Conditioning) components, home entertainment components, or smart home or office components. Service modules may connect to the vault appliance over the local network, just like any other device, or they may connect via a dedicated network, bus, or backplane, for example.

In some examples, the vault appliance is provided as a battery-backed unit equipped with a set of motion sensors. When the motion sensors detect movement of the vault appliance that exceeds a predetermined distance, the vault is configured to erase certain contents to render the vault inoperative for dispatching rights. Therefore, thieves hoping to access rights cannot benefit from stealing a vault, as the rights stored in the vault are destroyed upon movement. In an example, a user may create a recovery key, e.g., in the form of a small device, such as a USB memory stick, which the user may store in a safe location and use for restoring erased content, e.g., if a stolen vault appliance is recovered or if the vault appliance is inadvertently erased.

The security benefits of the vault appliance can be more fully realized when multiple parties employ vault appliances. For example, users and/or devices may each be associated with a "home vault" in a respective home location, with communication rights involving not only verification of users and/or devices to their respective home vaults, but also verification of the vaults to each other. Multiple vault appliances across different locations may form a vault network, which is supported by a set of servers on the Internet.

In an example, the servers may include a vault network server (VNS), which stores vault identifiers (vault IDs) and associated network addresses (e.g., IP addresses). A callback protocol may employ the VNS to promote secure communications between vaults. For example, when a first vault receives a right-request to communicate with a user, device, server, application, or other element supported by a second vault, the first vault may send a connection request to the second vault. The connection request includes the vault ID of the first vault. Upon receiving the connection request, the second vault may contact the VNS to look up the network address of the first vault and may contact the vault at the network address received from the VNS. Only if the connection request was originated from the received network address stored in the VNS can the communication proceed. Vault impersonators can thus be blocked and flagged.

In some examples, the set of servers may include a User Public Identifier (UPID) Name Server (UNS) that associates user public identifiers (UPIDs) with respective home vaults. In an example, a foreign user registered with a foreign vault may attempt to access a right stored on the foreign vault from a location of another user's home vault. To access a right from the foreign vault, the foreign user may send a request to the home vault at the current location. The request includes the foreign user's UPID. The home vault contacts the UNS to look up the network address of the home vault of that UPID. The local home vault then contacts the vault at the received address and, assuming the foreign user is registered with the vault at the received address, a secure session is established between the foreign user's device and the foreign vault. The foreign user can then send a right-request to the foreign vault over the secure session to exercise the right.

In some examples, a user may wish to access a right from outside the location of any vault, i.e., while roaming. In these examples, the user's device may be configured with basic vault functionality to enable the roaming device to establish a secure session with the user's home vault, e.g., in a manner similar to that described above.

In some examples, verification strength can be improved with the use of tags, i.e., physical devices whose presence can be detected by devices when the tags are located close by, e.g., using Bluetooth or WiFi. The tags (or a single tag) may be registered with a user's home vault, and detection of a tag in a vicinity of the device from which a request originates can increase verification strength, which may be particularly helpful in roaming scenarios.

In some examples, the vault network is a closed, self-defending network that employs protocols for maintaining security, which may exclude users, devices, applications, and/or vaults from participating if they violate vault network protocols.

In some examples, the use of vaults is not limited to home or office use and may extend to resources available over the Internet, such as public websites, data sources, and the like, with communications with and between such resources governed by the same vault protocols as described herein.

Certain embodiments are directed to a method of performing activities over a network. The method includes receiving, by a vault appliance, an introduction-request from an electronic device over the network. The introduction-request initiates an introduction operation between the electronic device and the vault appliance, the introduction operation (i) confirming an identity of a user of the electronic device by matching a user identifier received from the electronic device with a user ID stored within the vault appliance, and (ii) in response to the identity of the user being confirmed, establishing a secure, point-to-point session between the electronic device and the vault appliance. The vault appliance stores user information, passwords, and encryption keys for promoting secure activities over the network. Within a context of the secure, point-to-point session, the method further includes receiving, by the vault appliance from the electronic device over the network, a right-request to exercise a right on the network. The right has a predefined description stored in the vault appliance. In response to receiving the right-request, the method further includes performing a verification operation by the vault appliance. The verification operation is configured to (i) produce a successful result in response to a set of verification factors being satisfied and (ii) produce an unsuccessful result in response to the set of verification factors not being satisfied. The vault appliance is configured to permit the requested right to be exercised on the network in response to the verification operation producing the successful result and to prevent the requested right from being exercised on the network in response to the verification operation producing the unsuccessful result.

Other embodiments are directed to a vault appliance constructed and arranged to carry out a method of performing activities over the network, such as the method described above. Still other embodiments are directed to a computer program product including a set of non-transitory, computer-readable media having instructions which, when executed by control circuitry of a vault appliance, cause the control circuitry to perform a method for performing activities over a network, such as the method described above. Further embodiments are directed to methods, apparatus, and computer program products involving any of the above-described features, in any technologically sensible combination. Thus, embodiments hereof include any of the above-described features combined in any suitable way.

The foregoing summary is presented for illustrative purposes to assist the reader in readily grasping example features presented herein; however, this summary is not intended to set forth required elements or to limit embodiments hereof in any way.

BRIEF DESCRIPTION OF THE SEVERAL
VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. Once should appreciate that such embodiments are provided by way of example to illustrate certain features and principles of the invention but that the invention hereof is not limited to the particular embodiments described.

An improved technique for promoting network security employs a vault appliance that acts as a local security hub for users and their devices. The vault appliance stores user information and definitions of rights, i.e., activities that user devices may perform, and securely dispatches those rights in response to right-requests and subject to user and/or device verification. Communication with the vault appliance complies with protocols that limit the scope of user interaction and resist hacking.

Figure 1:
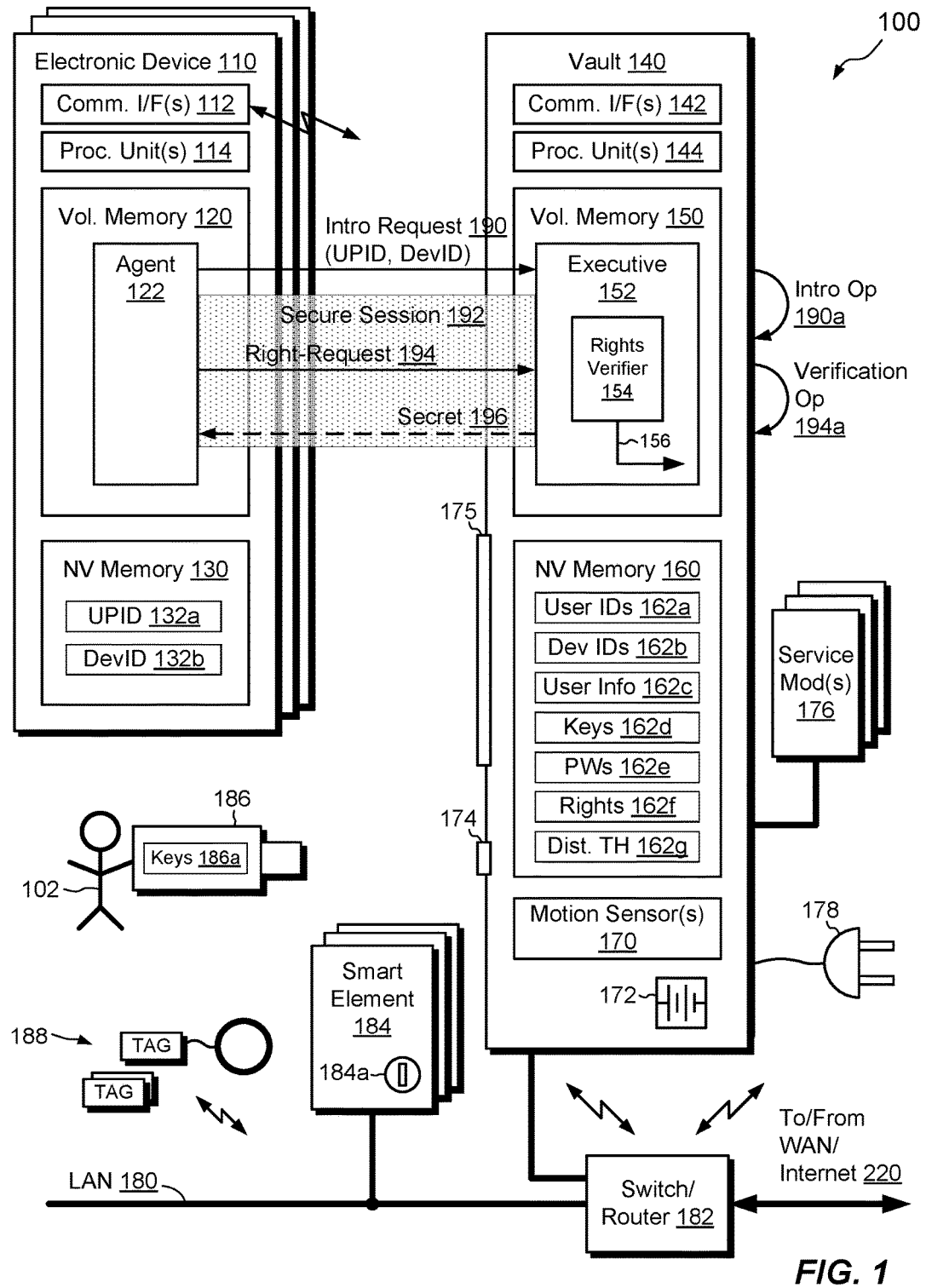
FIG. 1 is a block diagram of an example vault appliance and local environment in which embodiments of the techniques hereof can be practiced.

FIG. 1 shows an example environment 100 in which embodiments of the improved techniques hereof can be practiced. The environment 100 is seen to include an electronic device 110, a vault appliance 140, and a local area network (LAN) 180. A switch/router 182 provides an interface between the LAN 180 and a wide area network (WAN) 220, such as the Internet. The electronic device 110 may be any network-connectable device, such as a desktop computer, laptop computer, tablet, smart phone, set top box, gaming system, smart wearable, vehicle, or the like, and the environment 100 may include any number of electronic devices 110. Such devices 110 may be connected to the LAN 180, using wired or wireless (e.g., Wi-Fi) connections, and are thus discoverable on the LAN 180. The environment 100 may also include any number of service modules 176. The service modules 176 are special types of electronic devices 110, which serve particular functions within the electronic environment 100, such as to control gaming systems, home security components, HVAC components, home entertainment components, smart home or office components, and the like. In some implementations, the service modules 176 have a direct connection to the vault appliance 140, e.g., via a specialized network, bus, or backplane. The environment 100 may include various smart elements 184, such as smart appliances, gaming systems, smart TVs, and the like. Such smart elements 184 are also connected to the LAN 180, using wired and/or wireless connections. In an example, each smart element 184 has a lock 184a (e.g., a password and/or encryption key), which must be presented in order to control the element. The vault appliance 140 preferably has a direct, wired connection to the switch/router 182, although this is not required, as in some examples the vault 140 may be connected to the LAN 180 by any means, e.g., using a cable or wirelessly.

The electronic device 110 (or each such device) may include one or more communication interfaces 112, such as Ethernet cards, Wi-Fi adapters, etc., one or more processing units 114, such as processor chips or assemblies, and memory. The memory may include volatile memory 120, e.g., DRAM (Dynamic Random Access Memory), as well as non-volatile memory 130, e.g., one or more magnetic disk drives, solid state drives, chips, and the like. The volatile memory 120 may "include" (i.e., implement by software instructions that run on the set of processors 114) an operating system, as well as various applications, processes, and daemons. Included among these is agent 122, which provides executable code for communicating with the vault 140 (or other vaults) in accordance with vault protocols. In an example, the agent 122 is installed on the electronic device 110 specifically for the purpose of operating in a vault-based network. The non-volatile memory 130 may store data elements that enable successful communication with the vault 140, such as a UPID (User Public Identifier) 132a and a device identifier (device ID) 132b. In an example, the UPID and the device ID are each globally unique identifiers.

In a similar fashion, the vault appliance 140 includes one or more communication interfaces 142 (e.g., Ethernet cards, Wi-Fi adapters, Bluetooth adapters, etc.), a set of processing units 144 (e.g., chips, cores, assemblies, etc.), and memory, which may include volatile memory 150 (e.g., DRAM) and non-volatile memory 160 (e.g., magnetic and/or solid state devices). The volatile memory 150 includes an executive 152, which runs a rights verifier 154. The non-volatile memory 160 stores a host of information, such as user IDs 162a (e.g., of users registered with the vault 140), device IDs 162b (e.g., of devices registered with the vault 140), user information 162c, encryption keys 162d, passwords 162e, rights definitions 162f, and a distance threshold 162g. Preferably, the vault 140 stores identity data, passwords, keys, and rights, such that there is no need for the device 110 to store this information. For example, the user 102 need not remember passwords, keys, codes, answers to challenge questions, or the like. In some examples, a single vault password is the only user or verification information that the user 102 needs to remember.

The vault appliance 140 may further include a set of motion sensors 170, such as one or more accelerometers, and one or more batteries 172. Although the vault appliance 140 preferably has a line cord 178 for receiving line voltage, the batteries 172 provide backup power and keep the vault 140 functioning for a period of time after power has been removed.

The vault appliance 140 is preferably a small, low-power hardware device, which runs coolly enough to be contained within a locked box or other enclosure without overheating. The vault appliance 140 may have a user interface 175, although a service module 176 may present a user interface on behalf of the vault appliance 140. Preferably, any such user interface 175 is highly constrained so as to permit a limited number and scope of operations, such as to register users and devices, to define rights, and to run recovery operations in the event of data loss. The user interface 175 preferably does not support local installation of program code, Also, the vault appliance 140 preferably provides no provision for users to log on remotely; i.e., any attempt to register devices, define rights, modify rights, change user profile information, and so forth must generally be performed locally at the user interface 175. Insisting that users only change vault settings when local to the vault 140 further promotes security.

In example operation, a user 102 of an electronic device 110 wishes to perform some activity that involves accessing and dispatching one or more rights 162f, which have been defined and stored in the vault appliance 140. The rights 162f may take the form of content rights, communication rights, and/or action rights, for example. Some activities may involve accessing and dispatching multiple rights 162f. For instance, accessing content on a different device 110 may involve both a communication right to communicate with the other device and a content right to access a content element stored on the other device.

Dispatching a right 162f from the vault appliance 140 typically involves three sets of activities: (i) introduction, (ii) right-request, and (iii) verification. To initiate introduction, the agent 122 running on device 110 issues an introduction request 190 to the vault 140. The introduction request 190 may include the UPID 132a of the requesting user 102 and the Device ID 132b of the originating device 110, for example. The introduction request 190 preferably sends encrypted versions of these elements. In some examples, the electronic device 110 stores the elements 132a and 132b in encrypted form, with no access to their plaintext values. The device 110 may send the introduction request 190 over the LAN 180 (wired or wirelessly). Alternatively, the device 110 may send the request by other means, such as using Infrared or other kinds of RF transmission. In some arrangements, introduction may require authentication of the device 110. For example, the device 110 and the vault 140 may share a pair of deep blind secrets, and secure exchange and verification of these secrets may be required. Upon receipt of the introduction request 190, the vault 140 performs introduction operation 190a. For example, the vault 140 confirms that the UPID 132a has been registered with the vault 140, e.g., that the UPID 132a has been stored among the list of User IDs 162a within the vault. In some examples, the introduction operation 190a also involves verifying the device ID 132b, e.g., by confirming that the received device ID 132b can be found among the registered devices 162b. However, confirming the device ID 132b is not required in some embodiments, as it may be desirable to allow the user 102 to connect to the vault 140 from an unregistered device. If the vault 140 confirms that the UPID 132a (and optionally the device ID 132b) have been registered with the vault 140, then the introduction operation 190a succeeds and the vault 140 proceeds to establish a secure, point-to-point communication session 192 with the device 110. The session 192 is private between the vault 140 and the device 110, is protected by strong encryption, and cannot be spoofed.

Once the secure session 192 is established, the agent 122 running on the device 110 may issue a right-request 194 over the secure session 192. The right-request 194 is a request to dispatch a particular, pre-defined right 162f, which is stored in the vault 140, e.g., a content right, a communication right, or an action right. In an example, the device 110 specifies the particular right by providing a right identifier (RID).

In response to receipt of the right-request 194, the vault 140 performs verification operation 194a. For example, the rights verifier 154 executes a right-specific verification procedure, which is defined within the requested right 162f. Verification to the right is based upon multiple considerations surrounding the right-request 194. The rights verifier 154 generates a verification result 156, which indicates, for example, either success or failure. If the verification result 156 indicates a failure, the vault 140 may log the failure and prevent the requested right from being exercised. However, if the verification result 156 indicates success, the vault 140 may log the success and permit the requested right to be exercised.

The specific acts involved in exercising the right will depend upon the type of right and the particulars of its definition. For example, to exercise a content right, the vault 140 may securely provide a decryption key for unlocking the requested content and/or an encryption key for changing it. To exercise a communication right, the vault 140 may securely release a password or other data needed to communicate with another device (e.g., either on the local network or over the WAN/Internet 220). To exercise an action right, the vault may securely release any password or other information needed to perform an action on a smart element 184.

In general, exercising any right involves accessing a secret 196 stored in the vault 140 in connection with the particular right 162f. The secret 196 may take the form of a password, an encryption key, a decryption key, or any combination of these elements, for example. For exercising some rights, the vault 140 may securely send the secret 196 back to the device 110, such that the device 110 may apply the secret 196 in performing the requested activity. In other examples, the secret 196 is securely dispatched elsewhere, such as to another device or element, or is used internally and never released. Preferably, secrets 196 are system created. The user 102 does not need to know the secrets 196 in order for the vault 140 to execute rights. Rather, secrets 196 are preferably hidden even from legitimate users.

In an example, the secure session 192 between the device 110 and the vault 140 is kept open to allow multiple right-requests 194 to be sent without having to repeat introduction each time. Either the device 110 or the vault 140 may end the secure session 192 explicitly at any time, or the session 192 may close automatically after a predetermined interval of inactivity.

The environment 100 also supports the use of tags 188. In an example, tags 188 are small physical devices that the user 102 may carry on the user's person or have on hand to strengthen verification. For example, each tag 188 stores an identifier that can be read by the device 110 and/or the vault appliance 140, e.g., using Wi-Fi, Bluetooth, or direct connection (e.g., USB). In some examples, tags 188 are registered with the vault 140, and the vault 140 may associate each tag 188 with a password. When performing the verification operation 194a in response to a right-request 194, the vault 140 may search for known tags 188 in the environment 100, and/or the vault 140 may receive tag information from the device 110. The presence of a registered tag 188 in the vicinity of the user 102 may be used as a blind factor to strengthen verification, such that it may be easier for the user 102 to authenticate to a right when a tag 188 is found than when it is not.

In some examples, once a verification operation 194a succeeds for one right-request 194, a verification window may be kept open for a period of time for other right-requests 194, during which time additional verification is not required unless additional factors are needed, e.g., for verifying right-requests 194 that require different factors. In some examples, the verification window may be set to zero, such that each right-request 194 must be independently verified.

In preferred use, the vault appliance 140 has a fixed location within a home or office. For example, the vault 140 may be attached to a wall or panel, where it maintains a fixed position for its entire service life. In an example, all information stored in the vault is encrypted with local encryption keys also stored in the vault. To protect against theft of the vault 140 and its valuable secrets, the vault's motion sensors 170 are configured to detect movement of the vault 140. For example, motion sensors 170 may include one or more accelerometers. In an example, the vault 140 measures outputs from the accelerometers and double-integrates the outputs with respect to time to produce values corresponding to distance traveled in 3-dimensional space. If the distance traveled exceeds a predetermined distance threshold (e.g., 10 meters, 100 meters, etc.), the vault initiates a self-erase operation, in which it erases the local encryption keys, rendering the vault 140 useless for the purposes of dispatching rights and disclosing secrets. The batteries 172 allow the vault 140 to retain power for at least enough time to detect movement and complete the self-erase operation. The vault appliance 140 is thus self-protecting in the event of theft.

If a stolen vault 140 is recovered, or if its contents are erased for reasons other than theft (e.g., as a result of the user relocating the vault), deleted contents may be restored using a recovery key 186. In an example, the recovery key 186 is a USB memory stick or other memory device, which stores keys 186a. The keys 186a are backup copies of the local encryption keys that were deleted from the vault 140. To restore vault operation, the user 102 may plug in the recovery key 186 to a socket 174 of the vault (e.g., a USB port), and operate the user interface 175 to perform a recovery procedure. Upon completion of the recovery procedure, the vault 140 can resume normal operation.

Although the vault appliance 140 is preferably a hardware device, nothing prevents its operations and protocols from being implemented in software. Software implementations of the vault may be particularly attractive in data center environments, where the vault 140 may serve as a local security hub that supports one or more servers, websites, and the like. Data center environments are likely already to implement physical security measures that embodiments above are designed to provide, such that software applications are feasible without sacrificing security. In addition, the vault appliance 140 may be provided in the form of hardware configured as a blade or other circuit board assembly, which plugs into a card cage or other enclosure in a data center or other server environment. Further, the vault appliance 140 may be implemented as a custom chip or chipset, which forms a component of a larger electronic system. Thus, embodiments of the vault appliance 140 are not limited to any particular physical implementation.

As described, the vault appliance 140 acts as a personal security hub within the LAN 180. The LAN 180 itself may provide a local region of the vault's reach, in the sense that any device 110 or tag 188 physically connected to the LAN 180 or in range of its Wi-Fi signal can participate in communications with the vault 140 over the LAN 180 and is deemed to be "local." In some examples, the local region of a vault 140 may be determined more accurately. For instance, a map of a local region and its surroundings may be provided to the vault 140 or associated equipment. The vault may employ a transceiver (on board or separately) to triangulate the location of a device 110 relative to the map. The device 110 may be deemed to be local if the transceiver finds the device within the local region as indicated by the map; otherwise, the device 110 may be deemed non-local (e.g., remote).

In an example, locality to the vault 140 is a prominent factor in the verification operation 194 for certain rights. For instance, a determination that the device 110 is local to the vault 140 may significantly strengthen verification, such that much less proof is required for verification to succeed than if the device 110 were remote.

Further, one should appreciate that the benefits of the vault 140 may be more fully realized when multiple parties employ vaults 140 at respective locations. In these situations, vault appliances 140 may form a vault network, where rights may involve content access, communications, and/or actions between vault locations, including over the Internet at large.

Figure 2:
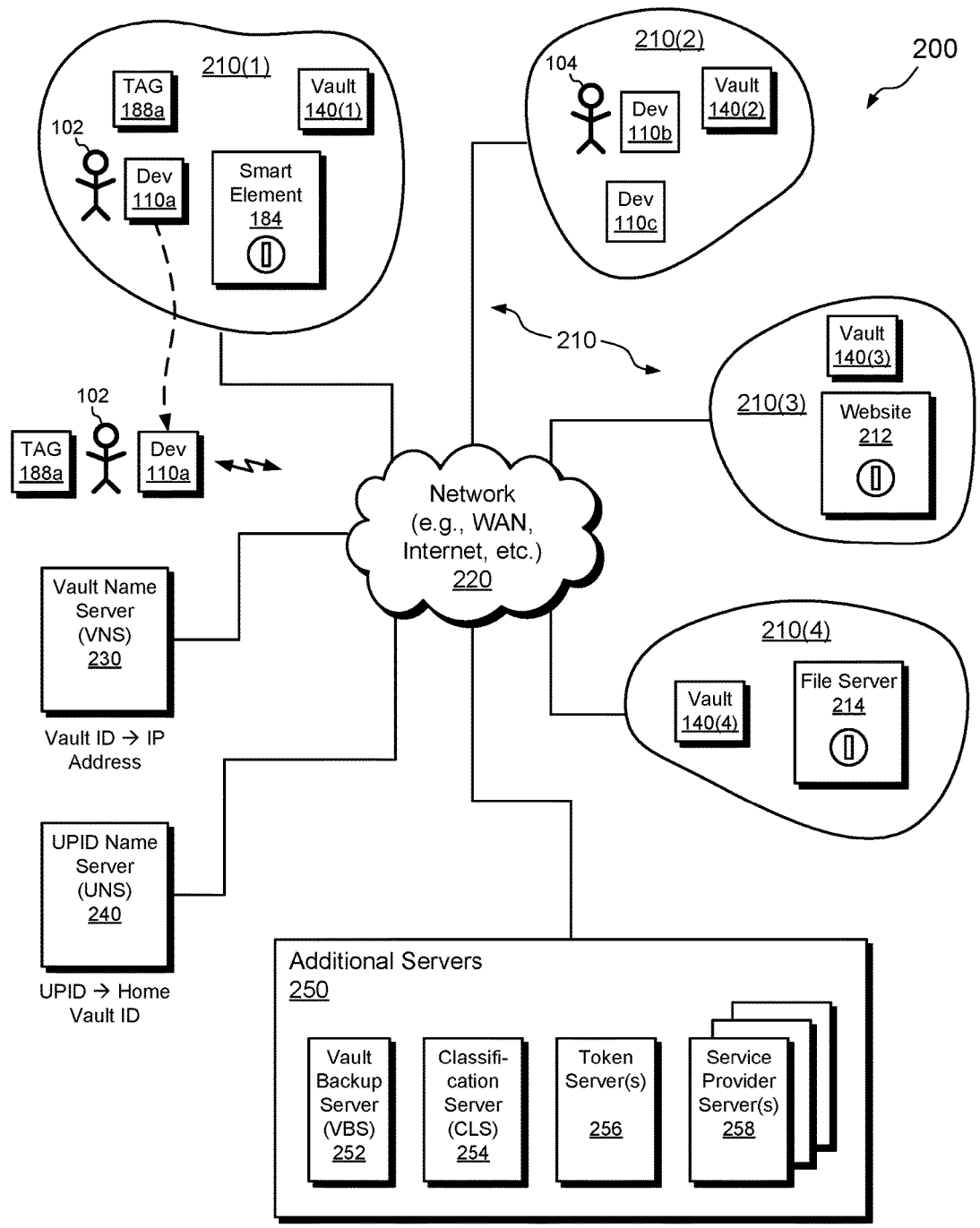
FIG. 2 is a block diagram of an example network environment in which embodiments of the techniques hereof can be practiced.

FIG. 2 shows an example vault network environment 200 in which multiple vault appliances 140(1) through 140(4) provide security in respective local regions 210(1) through 210(4). Each local region 210 is established, for example, by a LAN within the respective local region 210 (e.g., by the reach of its network cables and/or Wi-Fi signals), by triangulation, or by any suitable method. Thus, for any interaction between a device 110 and a respective vault 140, the device 110 may be deemed either to be local or not.

In the example shown, device 110a, tag 188a, and smart element 184 are all local to vault 140(1) in region 210(1), where user 102 is registered. Likewise, device 110b and device 110c are local to vault 140(2) in region 210(2), where user 104 is registered. Also, website 212 is local to vault 140(3) in region 210(3) and file server 214 is local to vault 140(4) in region 210(4). Although not shown, each region has a respective LAN, and each LAN is connected to the network 220, e.g., through a respective router.

In an example, various servers connect to the network 220 to support vault network operations. These include a Vault Name Server (VNS) 230, a User Public Identifier Name Server (UNS) 240, and additional servers 250. The VNS 230 stores a list of all registered vaults by vault ID and associates each vault ID with a respective network address, such as an IP (Internet Protocol) address where the vault can be found, and a public key of that vault. The UNS 240 stores a list of all registered users by user ID and associates each user ID with a respective "home vault," which may be designated by vault ID. In an example, each user may be registered on any number of vault appliances 140 but has only a single home vault, which is generally the vault 140 within the user's home or office. Additional servers 250 may be provided as follows:

Vault Backup Server (VBS) 252. Stores encrypted backup files of vault contents; may be used for vault recovery.
    Classification Server (CLS) 254. Stores identities of all registered elements on vault network (e.g., vaults, devices, tags, users, applications, smart elements, etc.)
    Token Server(s) 256. Offers content rights for sale or trade to vault network members.
    Service Provider Server(s) 258. Other servers (e.g., in addition to website 212 and file server 214) that provide services to users in accordance with vault network protocols.

Although the vault network servers 230, 240, 252, 254, 256, and 258 are shown as respective computers, this is merely an example, as the servers may be implemented using any number of computers, including a single computer. Further, each server may be implemented with any number of computers.

The vault network environment 200 supports a variety of secure operations between user devices 110 and vaults 140, between different vaults 140, and between different user devices 110 as supported by one or more vaults 140. For example, the vault network 200 allows one user to securely communicate with another user, via communication rights, both within a single local region 210 and between local regions 210. The vault network 200 also allows a user to securely access content both within and between local regions 210, via content rights, and to control smart elements 184 both within and between local regions 210, via action rights.

For dispatching rights across two local regions 210 in accordance with some examples, vault network protocols may require that the vault 140 in each local region first verify that the vault 140 in the other local region is a legitimate member of the vault network 200. For instance, each vault may perform a lookup of the other vault in the VNS 230. In such cases the requested right may then be exercised only if both vault identities are confirmed.

In some examples, a request from a user of one vault 140 to communicate with a user, device, or resource of another vault 140 involves a call-back procedure to confirm the requestor's identity. For instance, if a request to communicate is sent from a user on a first vault to a device on a second vault, the second vault may look up the home vault of the requesting user on the UNS 240 to confirm that the user is legitimate. Assuming the user is legitimate, the second vault may contact the vault at the address obtained from the UNS 230 to confirm that the vault is indeed waiting for a connection, which would be the case if that vault is truly the vault through which the user initially made the request. Exercise of the right may only proceed if confirmation succeeds.

Also, if a user in one local region 210 wishes to exercise a right, but the user's home vault is in a different local region, vault network protocols may require that a local vault receiving the user's request first perform a lookup of the user in the UNS 240. Only if the user is confirmed to be a legitimate member of the vault network 200 can activities for exercising the right proceed, with the local vault contacting the user's home vault at an IP address received from the VNS 230.

In some examples, the vault network 200 also supports roaming, e.g., situations in which a user is not currently within any local region 210. For example, as shown in FIG. 2, user 102 has left the local region 210(1) of that user's home vault, but still has a connection to the network 220, e.g., via a data network, cell phone network, Wi-Fi hotspot, etc. As the user 102 is not within the user's home region 210(1), the verification operation 194a may be much more difficult to satisfy, as verification strength outside the local region 210(1) may be low. The use of tag 188a may help to strengthen verification, however, as the tag 188a may at least partially compensate for the fact that the user is not in any local region 210. According to some variants, the user's device 110a may include software for implementing rudimentary vault functionality, such that the roaming device 110a may act as a non-home vault in communicating with other elements on the vault network 200.

Figure 3:
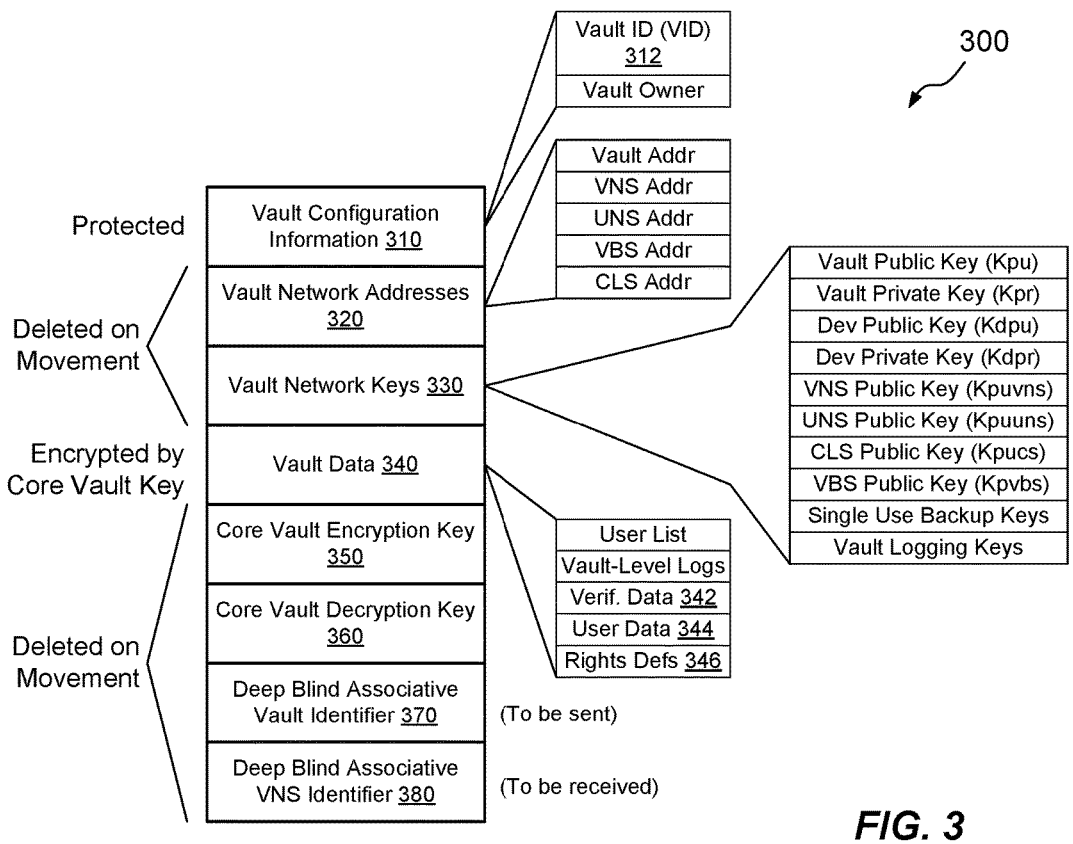
FIG. 3 is a block diagram of example data elements stored within the vault appliance of FIG. 1.

FIG. 3 shows example data elements 300 that the vault 140 (or any of vaults 140(1) through 140(4)) securely stores. The data elements 300 include the following:

Vault Configuration Information 310: Includes unique vault ID (VID) 312 of the vault 140 and a vault owner, who is preferably a user of the vault 140. In an example, the vault owner is identified by a UPID. This vault configuration information 310 is "Protected" because a secret stored in the vault data 340 (below) gates the ability to write this information 310. The secret is also stored in write-only non-volatile storage (e.g., in a register). To allow writing to or modification of the vault configuration information 310, the secret from the encrypted vault data 340 is presented to the register, with a match enabling configuration changes to proceed.

Vault Network Addresses 320: Includes network addresses (e.g., IP addresses) of the vault 140, as well as those of the VNS 230, UNS 240, VBS, 252, and CLS 254, for example.

Vault Network Keys 330: Encryption/decryption keys (symmetrical or asymmetrical) for communicating with other elements of the vault network 200, including:
  Public and private keys for the vault 140 (Kpu and Kpr);
  Public and private keys for each device registered with the vault 140 (Kdpu and Kdpr);
  A public key (Kpuvns) for the VNS 230;
  A public key (Kpuuns) for the UNS 240;
  A public key (Kpvbs) for the VBS 252;
  A public key (Kpucs) for the CLS 254;
  Single use backup keys, for restoring vault content from VBS 252 (e.g., if recovery key 186 is lost or corrupted); and
  Vault logging keys, used for securely storing logs of vault activities.

Vault Data 340: Includes vault content, such as a list of users (by UPID) registered with the vault 140, vault-level logs, verification data 342, user data 344, and rights definitions 346. Includes types of data 162a through 162f from FIG. 1.

Core Vault Encryption Key 350: Key used to encrypt vault data 340.

Core Vault Decryption Key 360: Key used to decrypt vault data 340.

Deep Blind Associative Vault Identifier 370: A first secret shared with the VNS 230 (and preferably ONLY with the VNS 230) and stored in a first register of the vault 140. The vault 140 sends this identifier to the VNS 230 using one-time encryption key to confirm its identity to VNS 230.

Deep Blind Associative VNS Identifier 380: A second secret shared with the VNS 230 (and preferably ONLY with the VNS 230) and stored in a second register of the vault 140. Used by vault 140 to compare against a value received in response to sending the identifier 370 to the VNS 230. The received value is also encrypted using a one-time encryption key. A match between the received value and the identifier 380 ensures that the VNS 230 is the source of the received value. The second register is preferably writeable and comparable but not readable.

As further shown in FIG. 3, the vault network addresses 320, vault network keys 330, core vault encryption and decryption keys 350 and 360, and deep blind associative identifiers 370 and 380 are all "Deleted on Movement," meaning that the vault executive 152 (FIG. 1) deletes these elements in response to the motion sensors 170 detecting movement of the vault 140 by a distance that exceeds a predetermined distance threshold. Deletion of these data elements renders the vault 140 incapable of responding to introduction requests 190a and right-requests 194a but leaves vault configuration information 310 and vault data 340 intact. These data are stored in encrypted form, however, and can only be read upon successful completion of a vault recovery operation.

Figure 4:
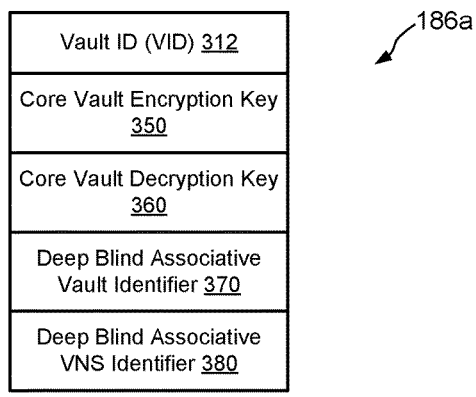
FIG. 4 is a block diagram of example data elements stored in a recovery key, which may be used to restore operation of the vault appliance of FIG. 1 after an erasure event.

FIG. 4 shows example contents of keys 186a, which are stored in vault recovery key 186, and which may be loaded into the vault 140 (e.g., via port 174) to perform a vault recovery operation. Here, it is seen that the keys 186a include the following:

VID 312;
Core vault encryption key 350;
Core vault decryption key 360;
Deep Blind Associative Vault Identifier 370; and
Deep Blind Associative VNS Identifier 380.

In an example, the keys 186a do not include all data that was erased, such as vault network addresses 320 and vault network keys 330. Rather, these data elements may be recovered separately after basic vault operation is restored, e.g., by contacting vault network servers and authenticating to one or more of these servers using deep blind associative identifiers 370 and 380. Note also that keys 186a do include VID 312, even though VID is not erased upon movement, to ensure that the keys 186a are paired with the appropriate vault 140.

Figure 5:
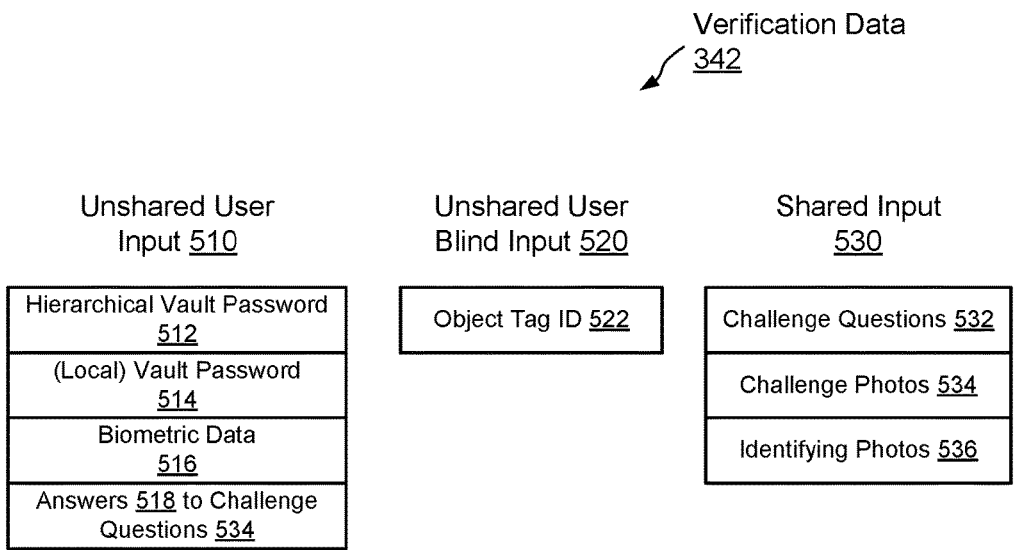
FIG. 5 is a block diagram of example verification data that may be stored in the vault appliance of FIG. 1.

FIG. 5 shows example verification data 342 in additional detail. The vault 140 may apply this verification data 342 when performing verification operations 194a. Preferably, this data 342 is not used when verifying a user to the vault 140, which happens during the introduction operation 190a, but rather in determining whether a particular write request 194a has been sufficiently verified. As shown, the vault 140 may store three types of verification data 342: unshared user input 510; unshared user blind input 520; and shared input 530. One should appreciate that the particular examples described herein are not intended to be exhaustive.

Unshared user input 510 refers to information that has been transmitted by a user to the vault 140 as user verification data. This category of verification data may include, for example, a hierarchical vault password 512, a local vault password 514, biometric data 516 pertaining to a user, and answers 518 to challenge questions 534. The hierarchical vault password is a variable length/strength password that may be presented by user devices 110, whereas the local vault password may be entered only locally at the vault 140, e.g., via the user interface 175 (FIG. 1).

Unshared user blind input 520 allows seemingly blind associations to be used as part of the verification operation 194a. Such input 520 is "blind" because the user does not necessarily perform any deliberate act to use the input as part of verification. Examples of user blind input 520 includes identifiers 522 of object tags 188. For instance, detection by the vault 140 or user device 110 of a tag 188 whose identifier matches an identifier 522 may increase verification strength, even if the user is not aware that this is happening.

Shared input 530 is information used for verification that is shared with a third party, which third party is not a vault 140 or a user of the vault 140. Shared input 530 includes, for example, challenge questions 532, challenge photos 534, and identifying photos 536. The challenge questions 532 are shared because the vault 140 may transmit them to a device 110, which may present them to a user. Also, challenge questions 532 may be used in customary authentication on the user device 110 (e.g., outside the vault network 200) and in second-party authentication systems. A challenge photograph 534 is simply a form of challenge question that asks "What is this?" in the form of a photograph. Identifying photographs 536 may be photographs of the user or other authorized persons. For example, a payment system might display to an operator a vault-provided photograph of the user or other authorized purchaser, such as a child, which might enable the operator to confirm the purchaser's identity.

Figure 6:
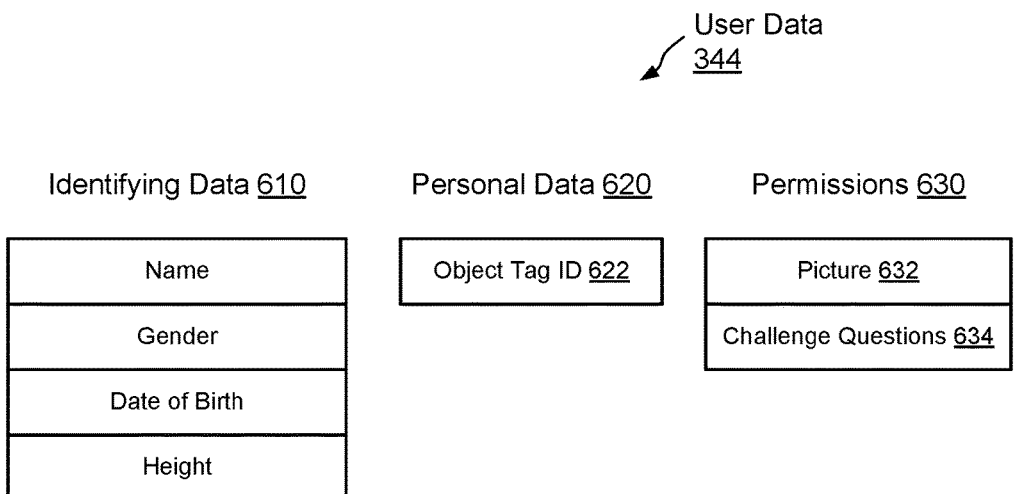
FIG. 6 is a block diagram of example user data that may be stored in the vault appliance of FIG. 1.

FIG. 6 shows example user data 344 in additional detail. User data 344 may include, for example, identifying data 610, personal data 620, and permissions 630.

Identifying data 610 serves to identify the user and may include a physical description and various personal identifiers for use by legacy identification systems, such as the user's name, height, weight, hair color, social security number, passport number, and driver's license number, for example. Preferably, the vault network does not use identifying data 610 for verification; rather, the vault 140 may transmit identifying data 610 to interested third parties on a need-to-know basis. In some examples, the vault 140 may share biometric data 516, this way as well, but this is not recommended. In an example, sharing of identifying data 610 is performed in connection with establishment or execution of a right.

Personal data 620 includes information that a user may wish to safely store, access, and/or share, such as phone numbers, email addresses, instant messenger (IM) addresses, medical data, and/or any other data. Users can define content rights to share personal data 620 with other parties, so users should exercise care in deciding which information to store and the level of verification to require of other parties who wish to access the information. For example, users may set a required level of verification to be commensurate with the importance or value of the data that the right protects. As with the identifying data 610, sharing of personal data 620 is performed in connection with establishment or execution of a right.

Permissions 630 are actions that other components of the vault network 200 are allowed to perform on the user and/or the user's resources. For example, a component may deny service to a user who refuses to give permission for an action, e.g., when performing the action is part of the service being provided. There are cases in which the user has established permissions so as to prohibit an action, but the user is accessing a service or location that requires the action to be approved, such as with surveillance video. In such cases, the vault 140 may alert the user that video is being used. Thus, even in cases where the demands of the service provider must be protected (e.g., as with surveillance video), the vault network does not allow the prohibited action to proceed without informing the user.

Within the vault network 200, vaults 140 may employ communication rights to store network-accessible account information. For example, information used by just one account (e.g. account number, user name, password) may be stored in a communication right for that account. In such cases, the communication right stores the identity of the other party, e.g., in an authentication list for that communication right. Information common to multiple accounts, such as name, address, credit card number, etc., may be stored in a user profile. Communication rights may specify conditions and limitations on access to user profiles. One should appreciate that each communication right is a right that exists between two parties, which parties may be identified by their respective UPIDs. Each party to a communication right has a right to communicate with the other party and may provide permissions that allow and/or restrict access to its information and to actions that are allowed to be performed on its data or resources by the other party.

In some examples, an implementation to access information in a user's profile associates an action field of a right with a piece of profile information. The action may specify "Read this piece of profile information," for example. As verification to any right maps to a set of permissions, profile information can only be viewed to the extent that the right owner has established permissions to allow it.

Figure 7:
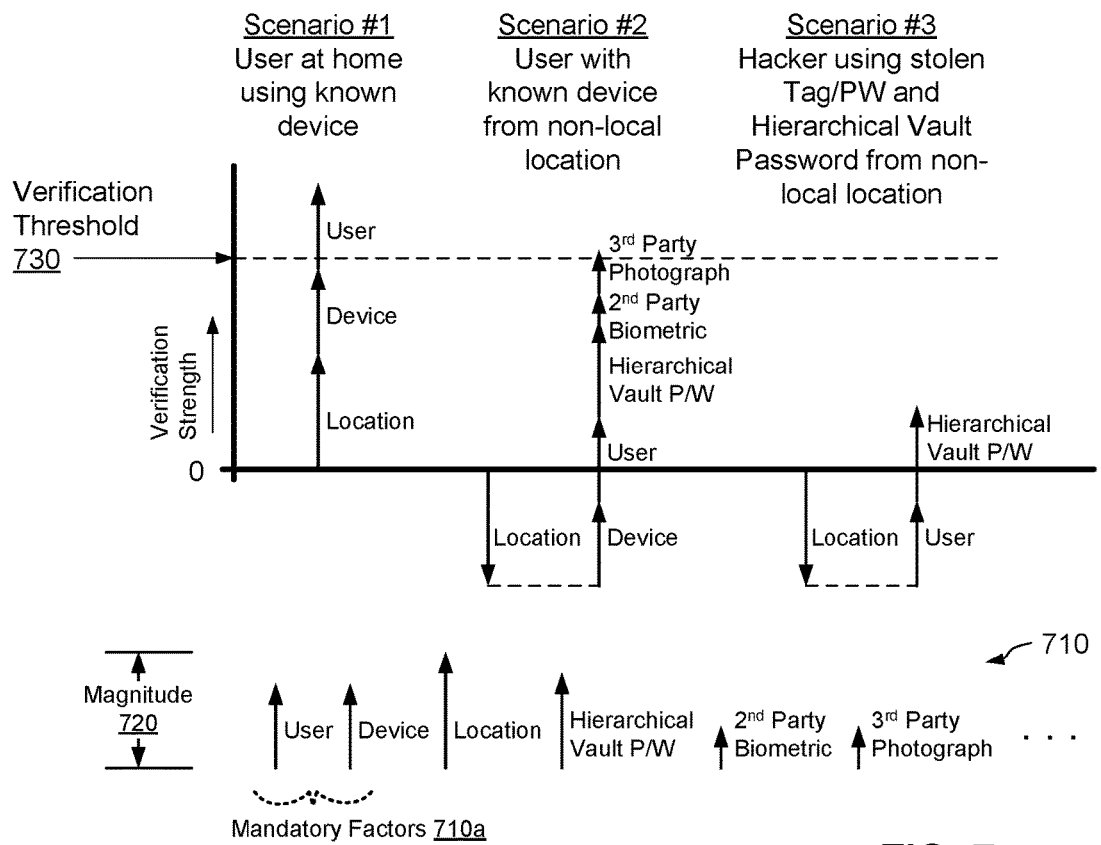
FIG. 7 is a graph showing an example arrangement for performing verification based upon multiple factors in response to a request to dispatch a right.

FIG. 7 shows an example arrangement for variable verification, which may be performed by the rights verifier 154 (FIG. 1) as part of a verification operation 194a, i.e., in response to a right-request 194. Here, multiple verification factors 710 each have a magnitude 720, which establishes a strength of that factor's contribution to an overall verification strength. In this example, verification factors 710 include a user identifier, the device ID of the device 110 originating the request, the location of the device 110 (e.g., either local or non-local), the hierarchical vault password 512 (or some number of digits thereof), second party biometric data, and a third party photograph. As shown, the magnitudes 720 of factors 710 may differ from one another, such that some factors contribute more to overall verification strength than others.

In an example, the hierarchical vault password 512 permits one to use (and hence risk exposure of) a limited number of digits of the entire password to achieve desired authentication strength. In an example, each digit of the hierarchical vault password 512 adds a fixed amount of magnitude 720, with a greater number of digits providing a greater magnitude 720. It is recommended that the hierarchical vault password 512 be a system-derived random number. Humans can easily recall 7 to 10 digits. As the vault network 200 provides communication rights, which eliminate the need for users to memorize passwords and other information, the hierarchical vault password 512 results in a huge reduction of the total amount of information that a person must memorize to effectively live his or her digital life.

FIG. 7 shows three different right-request scenarios. In a first scenario (Scenario #1), the user is at home, i.e., in a local region 210 of the user's home vault 140, and the right-request 194 to be verified originates from a known device 110, i.e., a device that has been registered with the user's home vault 140. Here, a sum of the magnitudes 720 of the individual factors for user, device, and location exceeds a predetermined verification threshold 730, which must be exceeded for verification to succeed. In this scenario, variable verification does succeed, even without considering other factors.

In a second scenario (Scenario #2), the user again operates with a known device 110 (e.g., registered to the user's home vault) but the user is not local to the region 210 of the home vault. In this scenario, non-locality of the user reverses the sign of the location component, which here is seen to subtract from the overall verification strength. However, enough other factors 710 are satisfied to enable the sum of all factors 710 to exceed (just barely) the threshold 730. Thus, variable verification again succeeds, although with a greater number of factors having to be considered.

In a third scenario (Scenario #3), a hacker has stolen a tag 188 from the user and holds the hierarchical vault password 512 for the user's home vault. But the hacker issues the right-request 194 from a location that is not local to the home vault. In this case, non-locality of the request again reverses the sign of the location component, which subtracts from the overall verification strength. Although the tag 188 may falsely verify the user's identity, the originating device is unknown and the hierarchical vault password 512 is not strong enough to enable the sum of magnitudes 720 to exceed the threshold 730. Thus, variable verification fails in this scenario.

One should appreciate that different rights may involve different combinations of verification factors 710. Thus, factors to be applied may depend on the right being requested, with the particular verification factors 710 to be used specified in the definitions of the particular rights. Although not shown, each right definition may specify a respective verification threshold 730. For example, the threshold 730 may assume a higher value for certain rights (e.g., access my bank account) than for others (e.g., visit a website).

For some right definitions, certain factors 710a may be designated as mandatory. A mandatory factor 710a must be satisfied unconditionally in order for the verification operation 194a to succeed.

Figure 8:
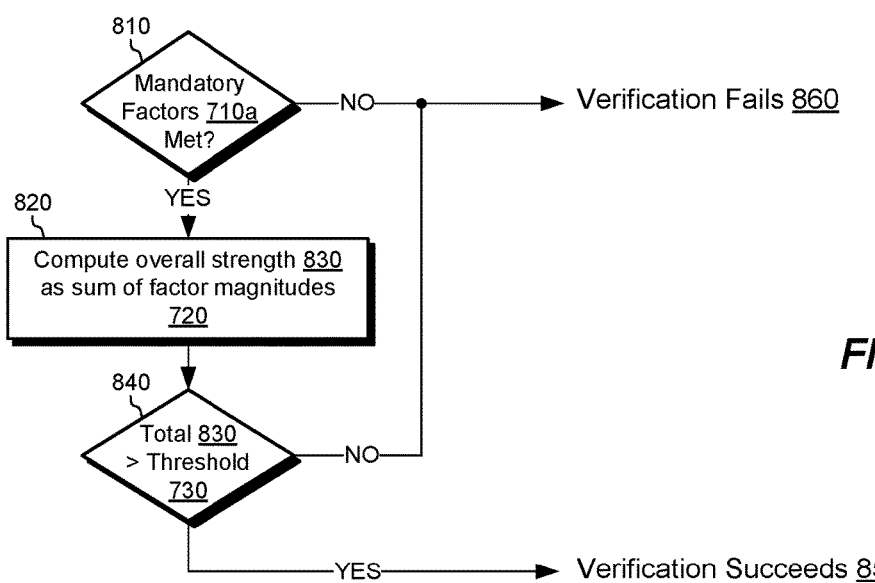
FIG. 8 is a flowchart showing an example method for performing verification using the arrangement of FIG. 7.

FIG. 8 shows an example method for performing the verification operation 194a in the manner described above. At 810, the rights verifier 154 checks whether mandatory verification factors 710a are satisfied. Only if all are satisfied does operation proceed to 820; otherwise, verification fails (860).

At 820, the rights verifier 154 computes overall verification strength 830 as a sum of magnitudes 720 of factors 710 used in verifying the particular right. At 840, verification succeeds (850) only if the total 830 exceeds the verification threshold 730; otherwise, verification fails (860).

Figure 9:
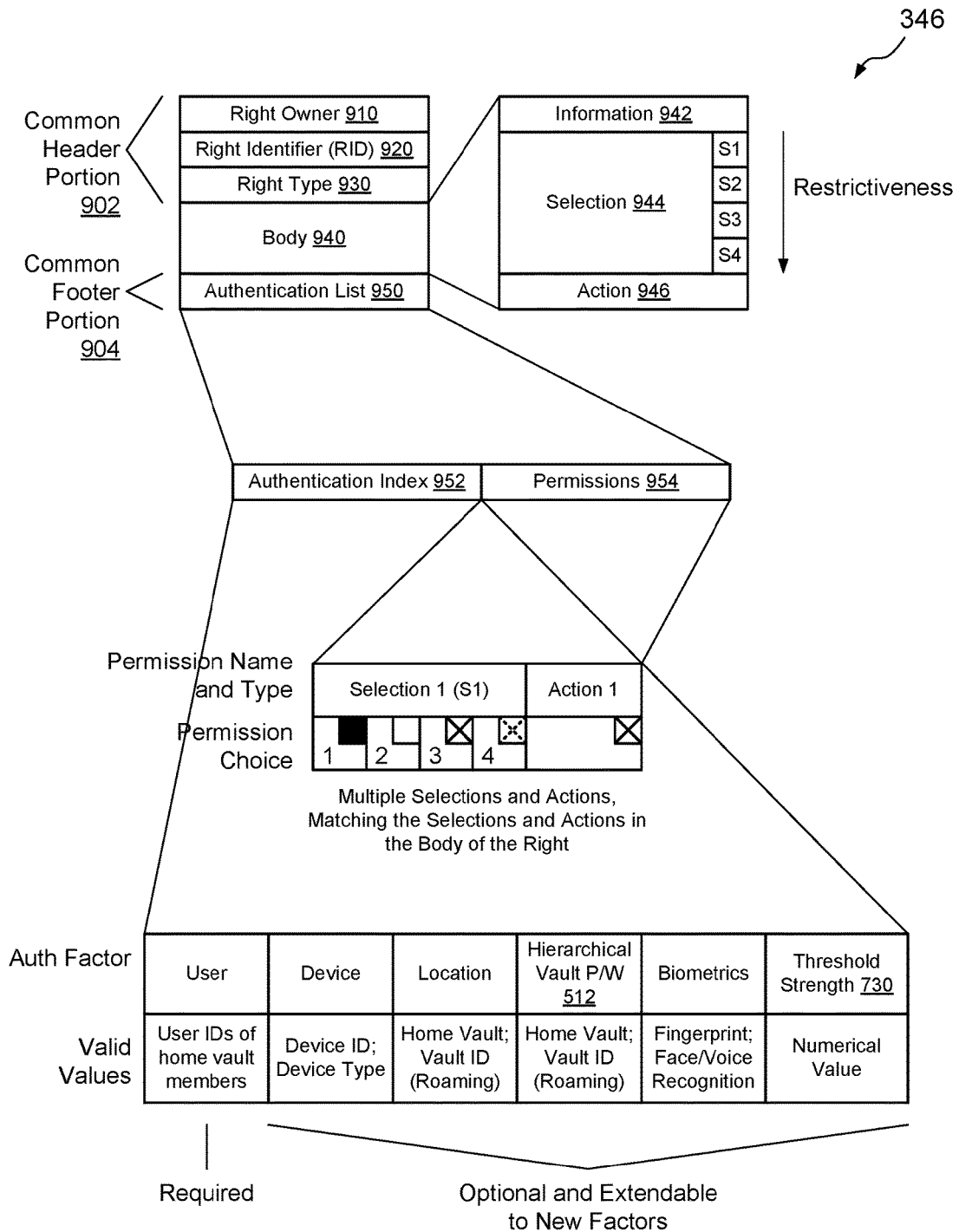
FIG. 9 is a block diagram of an example uniform right format for defining a right.

FIG. 9 shows an example common extensible format for defining a right in the vault 140. The format shown in FIG. 9 is intended to be common to all types of rights, including content rights, communication rights, and action rights. In an example, rights have the following characteristics:

Common extensible rights format;
Common verification method;
Verification to specific permissions within a right;
Are contained and protected from threats by vaults 140; and
Are executed by vaults 140 uniformly for all right types.

Each right contains a list of permission sets indexed by a potentially unique combination of the various factors available for verification. Executing a right is synonymous with the vault 140 performing a transaction on behalf of a user.

Here, right definition 346 includes a header portion 902, a footer portion 904, and a body 940. The header portion 902 specifies a right owner 910 (e.g., the UPID of the user who defined the right), a right identifier (RID) 920 that uniquely identifies the right within the vault 140, and a right type 930, e.g., content, communication, or action. As UPIDs are preferably globally unique and each right is preferably unique to a particular user, the RID 920 need only be unique to the right owner 910.

The footer portion 904 includes an authentication list 950. The authentication list 950 includes an authentication index 952 and permissions 954, which provide a subset of permissions stored in the body 940 of the right. The index 952 of an element on the list 950 contains the authentication requirements for that set of permissions. The authentication index 952 is composed of multiple factors. In some examples, the factor for user must always be present.

An authentication index 952 is defined by a set of values chosen for each of the included verification factors 710. For example, the user, device, location, and specific threshold strength 730 could compose one index. This means that a specific user, using a specific device 110 in a specific location may also need to add arbitrary factors to achieve the required strength 730 in order to be verified for a given set of permissions. For any given verification attempt, the attempt may satisfy some set of verification indexes. The set is possibly empty. The union of all permissions, corresponding to the indexes in the set, forms the permissions that the user has available during the execution of the right. If the set is empty then the right is not executed.

The body 940 of the right includes three kinds of fields, an information field 942, a selection field 944, and an action field 946. The number of fields of each kind depends on the type of right.

The information field 942 provides information and/or restrictions for the right, which must always be obeyed. Examples include:
  For a content right: maximum file size; encryption key;
  For a communication right: a connection endpoint, such as a user, server, or element; minimum required bandwidth; password for the connected entity;
  For an action right: Maximum RPM for a motor being controlled; password, element ID.

The selection field 944 represents a choice. The owner of the right selects the least restrictive choice that would ever be needed. This selection allows that choice and any more restrictive choices to be selected within the permissions 954 in the authentication list 950. A simple example is a two-choice write/read selection field 944. If "write" is selected, e.g. as S1 of selection 944, then "read" (e.g., as S4) is automatically permitted because it is a more restrictive choice. As shown for Section 1 under permissions 944, multiple choices for a single selection may be allowed. The choices are ordered from least restrictive (e.g., 1) to most restrictive (e.g., 4) and ordered that way in the selection list 944. Examples of selection 944 for various rights may include:
  Content Right: Access, with selections: write, read, read summary, and read title.
  Communication Right: Maximum data rate, with selections: 1 Gbit/sec, 500 Mbit/sec, and 50 Mbit/sec.
  Action Right: Speed Control, with selections: 250 MPH, 85 MPH, and 65 MPH.
Although the number of selections in the selection field 944 is shown to be four, this is merely an example, as the number of selections may be user-defined and right-specific.

As seen in Selection 1 under permissions 954, the first choice is blacked out, meaning that this selection is not available to choose, in this case because the least restrictive selection available is the second choice. Here, we assume that, in the body 940 of the right, the owner has selected choice 2. Note that if one choice is not available, all lower numbered choices are not available, either. In this case, the owner has explicitly given this authentication index the permission for choice 3. Thus all more restrictive choices (e.g., choice 4) are implicitly allowed.

The action field 946 controls whether a single action is permitted for the object on which the right is to be executed during the time the right is being executed. When the execution of the right is complete, the ability to perform the action specified in the action field 946 is terminated. The action field 946 is not to be confused with the action right. With the action field 946, the user has permission to execute the action but is not required to do so. With an action right, executing the right means performing the action specified. Examples settings of the action field 946 are given below:
  Content Right: Screenshot;
  Communication Right: Mute; and
  Action Right: Get status; start machine.

With the action field 946, the above actions are permitted during the time the right is being executed but are not required, as the user may choose not to perform them.

An application designed for the vault network 200 may create a specific instance of a right and add application-specific information to that instance. In an example, the vault network must approve all user-created and application-created instances of rights. The reason for this is twofold. First, rights must be verified to confirm that they abide by the rules of the vault network 200. Second, it is the responsibility of the vault network 200 to author and distribute software to provide any new functionality required in vaults 140 to support new rights.

The common verification method for all rights helps in three very significant ways. First, it reduces the complexity of having a large number of different verification methods that a user may need, greatly reducing the amount of information that must be memorized or kept on hand in order to live ones digital life. The common verification method may include all online user accounts, all program accounts, all controls, and all protected data, for example. Second, reduction in complexity yields a corresponding reduction in bugs and therefore a corresponding increase in security. Third, storing rights on the vault 140 and verifying to the vault means that the device 110 does not need to carry any user verification information. Commercially available alternatives, such as password keychains, store verification information on-device. Such systems are vulnerable, however, as once a device containing a password keychain is compromised, many accounts may be compromised all at once.

In some examples, the vault 140 can defend intellectual property rights within a content right. This means that the owner of a content right cannot violate the rights of the intellectual property owner. In an example, the body 940 of the content right is broken up into two parts, one for the owner and one for the intellectual property owner. The intellectual property owner specifies what permissions it wishes to permit and deny for the given content. This includes the standard read/write/modify as well as which applications may be used and where the data may be stored or transmitted. The owner of the content right cannot make less restrictive choices than the intellectual property owner has made. The owner can, however, add his or her own additional set of independent restrictions, compliant with the fact that all content rights must be vault network approved. In an example, the owner can also further restrict any choice of the intellectual property rights owner. This is analogous to the generation of the permission list based on choices in the body 940. For instance, if the owner of the intellectual property right gave write access, the owner could reduce this to just read access.

The intellectual property owner can also restrict access to the right via the verification process; example restrictions are locations or relative user, i.e. owner or members of owners vault. This is done in the body 940 of the right via an information field. The owner may also further restrict but not expand the choices of the intellectual property owner on its verification choices. The vault enforces restrictions from the intellectual property owner.

Figure 10:
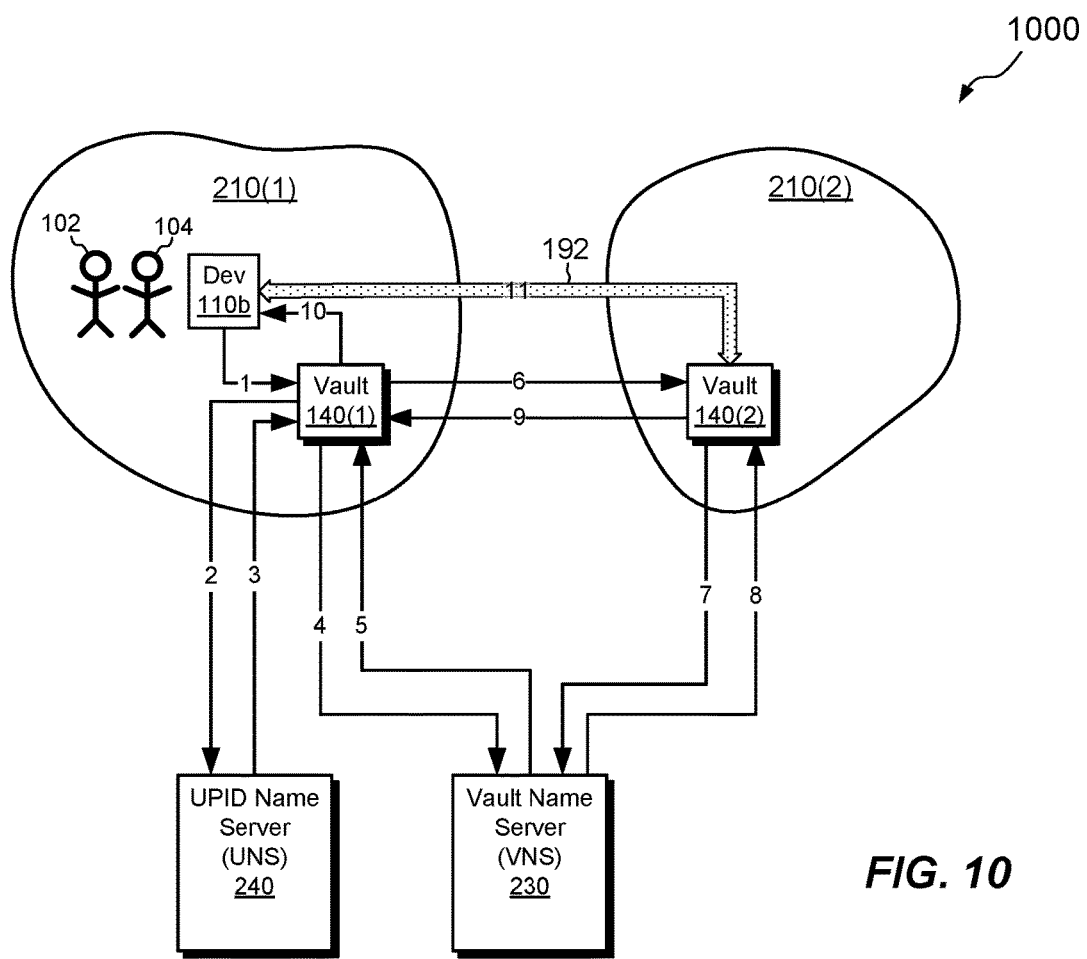
FIG. 10 is a block diagram of an example arrangement in which a user accesses the user's home vault from another vault's location.

FIG. 10 shows an example arrangement 1000 in which the user 104 (FIG. 2) with device 110b has left the region 210(2) of his home vault 140(2) and has traveled to local region 210(1), where the local vault is vault 140(1). At some point, user 104 may wish to exercise a right. Rights of user 104 are stored in vault 140(2), but the local vault is vault 140(1). In this case, when user 104 operates device 110b to exercise a right, device 110b sends an introduction-request 190 to the local vault 140(1), e.g., over the LAN in region 210(1). This introduction request 190 is labeled as step 1 and includes the UPID of the user 104.

At step 2, upon receiving the introduction request 190, the local vault 140(1) contacts the UNS 240 to perform a lookup on the UPID of user 104. At step 3, the UNS 240 returns the vault ID 312 of the home vault 140(2) of user 104.

Next, the local vault 140(1) performs a lookup of that vault ID 312 on the VNS 240 (step 4). The VNS 240 returns the IP address and public key of the home vault 140(2) (step 5).

At step 6, the local vault 140(1) contacts the home vault 140(2) of the user 104 to indicate the user request 190, providing its own vault ID 312. The home vault 140(1) contacts the VNS 240 (step 7) to validate the local vault 140(1). For example, a response (step 7) from the VNS 240 includes the public key of the local vault 140(1). The home vault 140(2) attempts to communicate with the local vault 140(1) using the public key at step 8. At step 9, the home vault 140(2) informs the local vault 140(1) that it has been validated, and at step 10 the local vault 140(1) informs the device 110b that the home vault has been found and provides its IP address.

At step 11, the device 110b establishes a secure, point-to-point session 192 with the home vault 140(2), thus completing an introduction operation 192a. With the secure session 192 established, the device 110b can proceed to send right-requests 194 to the home vault 140(2), just as it would if it were local.

One should appreciate that the arrangement of FIG. 10 may be realized between any two local regions 210, with the local vault that receives the introduction request 190 from a device 110 first checking whether it is the home vault for the UPID received with the request 190. If so, the local vault handles the request. Otherwise, the local vault looks up the home vault for that UPID, contacts the home vault, and coordinates with the home vault in establishing a secure session 192 between the device 110 and its home vault.

Figure 11:
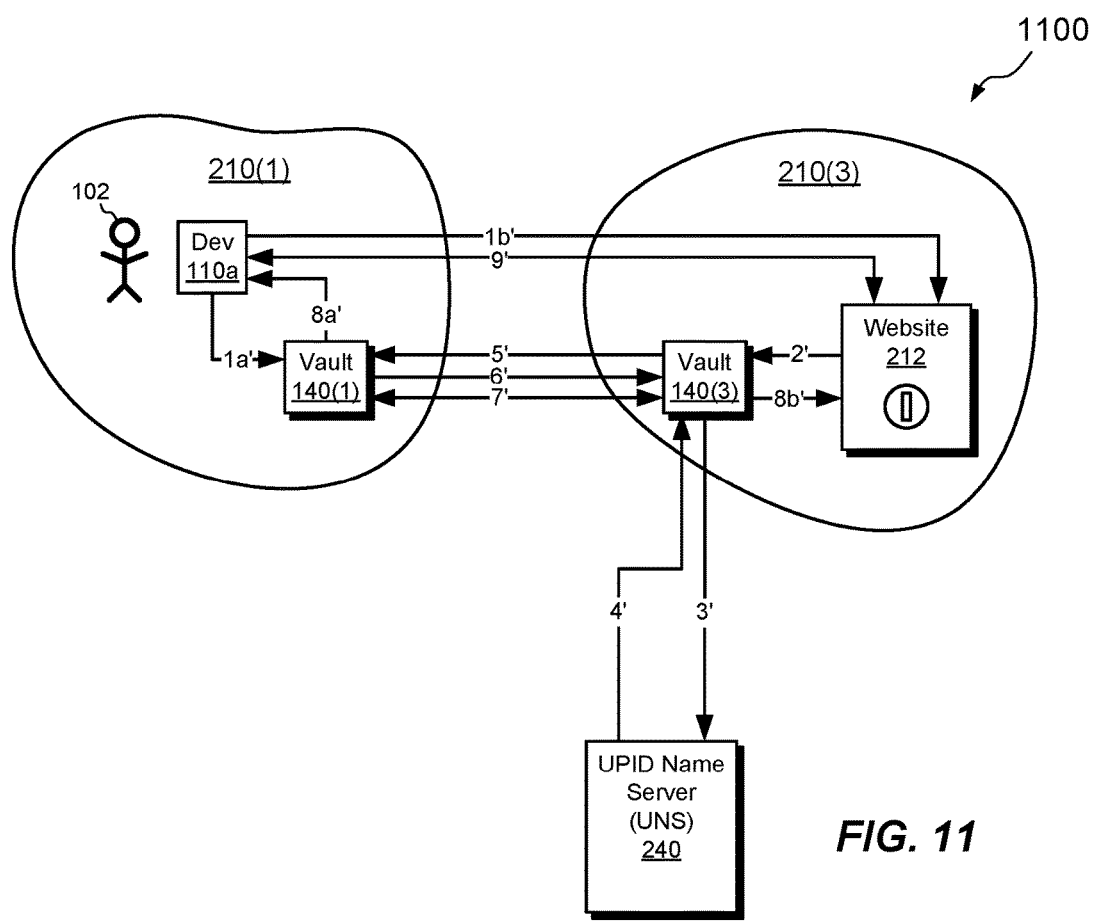
FIG. 11 is a block diagram of an example call-back arrangement for dispatching a communication right that involves a second vault.

FIG. 11 shows an example arrangement 1100 for performing a call-back procedure as a prelude to exercising a communication right. In this example, the user 102 operating device 110a wishes to exercise a communication right for communicating with website 212 in region 210(3), whose home vault is vault 140(3). As communication rights are typically between two UPIDs, the user 102 is one UPID and the website 212 is another UPID. The website 212 also functions as a device in this example.

At 1a', the device 110 notifies its home vault 140(1) that a request is pending to the remote UPID, i.e., to the website 212. At or around the same time, step 1b' is performed, in which the device 110a notifies the remote UPID (website) that the user 102 would like to communicate. The transmission at step 1b' may be outside the scope of the vault protocols. At 2', the website 212 informs its vault 140(3) that the communication is pending.

At 3', the remote vault 140(3) performs a lookup of the user 102 on the UNS 240. At 4', the remote vault 140(3) obtains the home vault 140(1) of the user 102 from the UNS 240. At 5', the vault 140(3) contacts the vault 140(1) to ask whether a request for communication is pending.

Assuming so, then at 6' and 7' the two vaults 140(1) and 140(3) exchange session keys, which are passed to the respective devices at 8a' and 8b'. At 9', with the session keys in place, the device 110 may proceed to communicate securely with the website 212.

Figure 12:
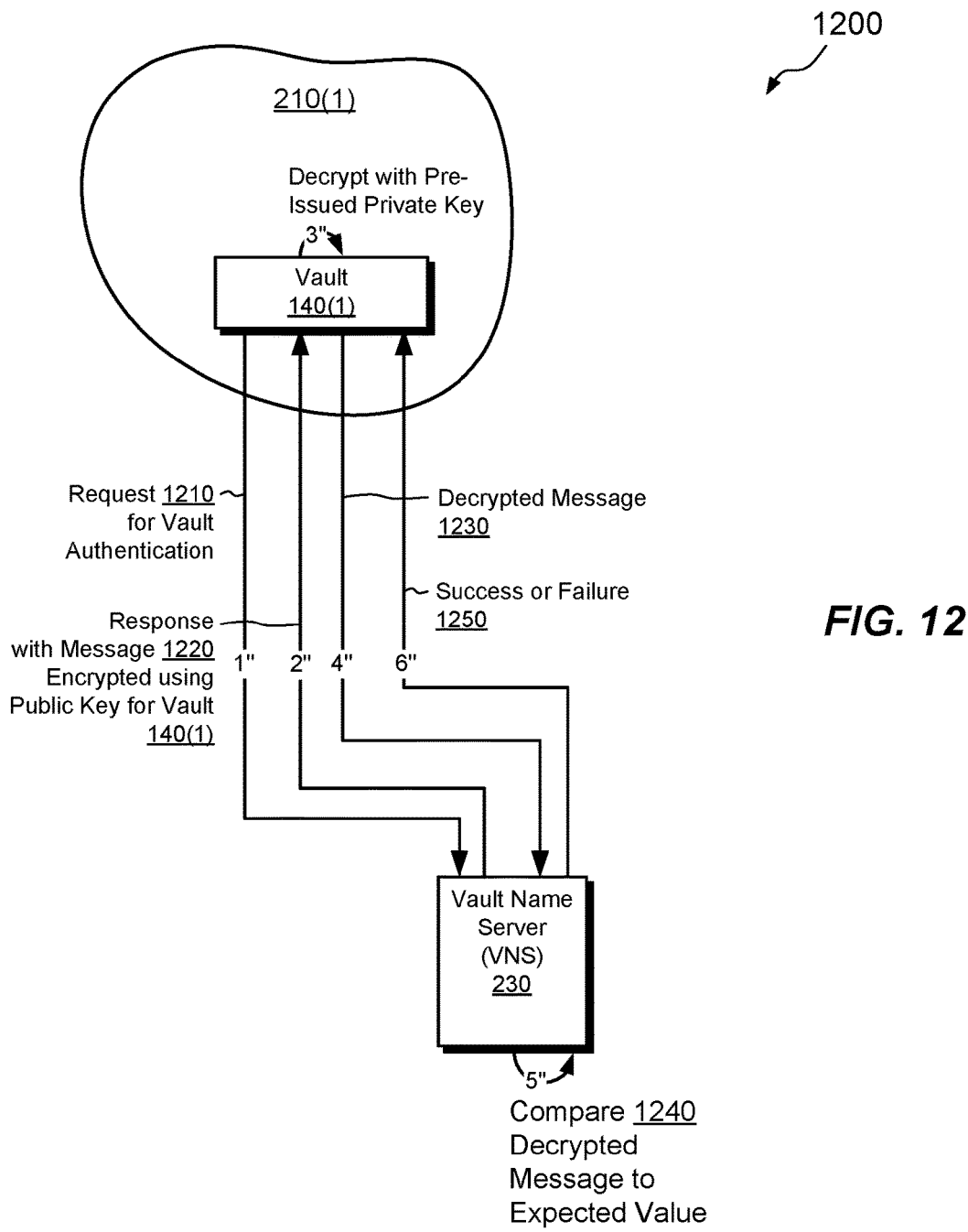
FIG. 12 is a block diagram of an example arrangement for authenticating a vault to a vault name server (VNS).

FIG. 12 shows an example arrangement 1200 in which the vault 140(1) authenticates to the vault network 200. The process begins at 1", where the vault 140(1) sends a request 1210 for vault authentication to the VNS 230, which responds at 2" with a benign message 1220 that is encrypted using the public key of the vault, Kpu (FIG. 3). At 3" the vault 140(1) decrypts the encrypted message with its pre-issued private key, Kpr. At 4" the vault 140(1) sends the decrypted message 1230 back to the VNS 230, which performs (at 5") a comparison 1240 between the received, decrypted message 1230 and an expected value. The comparison 1240 either succeeds (if there is a match) or fails (if no match). At 6" the VNS 230 sends the comparison result (success or failure) 1250 back to the vault 140(1).

In some circumstances, even stricter vault authentication may be required. In such cases, vault authentication may proceed using the pair of deep blind associative identifiers 370 and 380 (FIG. 3) in the manner described above.

Figure 13:
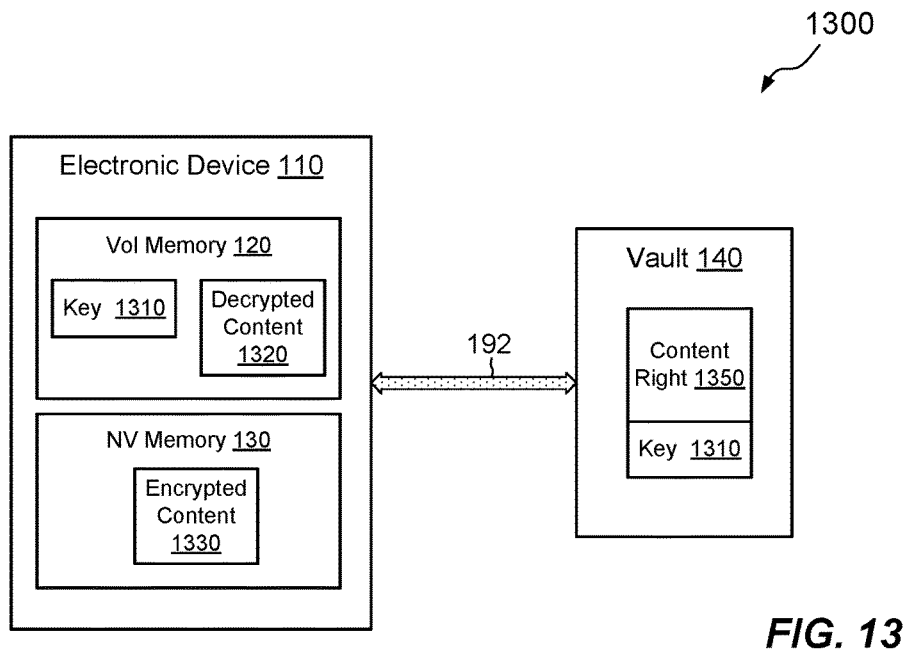
FIG. 13 is a block diagram of an example arrangement for dispatching a content right.

FIG. 13 shows an example arrangement 1300 for exercising a content right. For content rights, the secret 196 is a key 1310 used to encrypt/decrypt the content element, e.g., a file. Encryption/decryption is performed on vault network-approved devices with vault network-approved applications. A secure session 192 is established, in the manner described above, to pass the key 1310 to the device 110. The device 110 requests access to the key 1310 and may use the key until the key is released. To achieve intended operation, the device 110 must follow three simple rules. First, the device 110 may not pass the key 1310 to any third party. Second, the device 110 may not store the key 1310 in non-volatile memory. Third, the device 110 may not store the key 1310 after the application that used the key has been closed.

Figure 14:
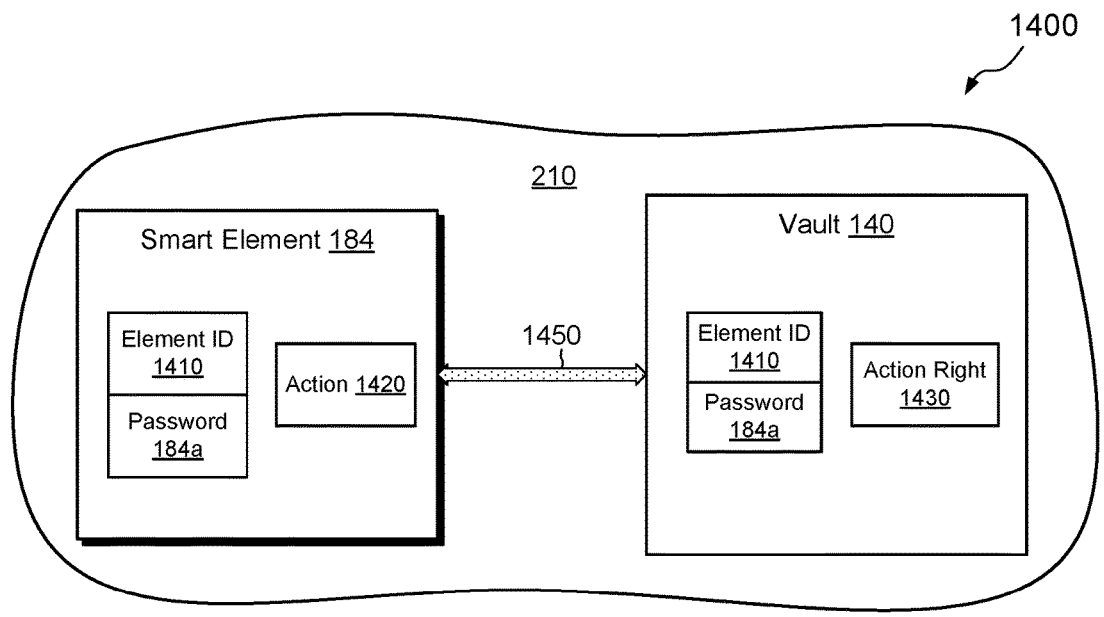
FIG. 14 is a block diagram of an example arrangement for dispatching an action right.

FIG. 14 shows an example arrangement 1400 for exercising an action right 1420. For action rights, the secret 196 is an identifier/password pair (1410/184a) for the smart element 184 to be controlled. In some examples, the elements 184 on which actions 1420 are performed must be within the local region 210 of the vault 140 that contains the relevant action right. The purpose of requiring locality is to ensure that the complete extent of the connection to the element 184 is under control of the vault 140 and associated location-determining equipment (e.g., LAN 180, triangulation equipment, etc.). The vault 140 and equipment locate the element within the local region 210. For an element 184 that has a fixed location, the system may confirm that the element has not moved, which might indicate a cloning attack. The vault 140 and location equipment also ensure that the element 184 is not cloned from outside of the local region 210.

In an example, elements 184 within the local region 210 of the vault 140 are protected by protocols that encrypt data being sent. These protocols may use rolling encryption keys to ensure that no two messages for the same command can be detected as being the same over the air. Each transaction to the element 184 uses a specific rolling key. During each transaction, the key to use for the next transaction is agreed upon. If the control vocabulary of an element only contains two words, such as On and Off, encryption by itself would be meaningless, as a hacker would merely have to replay the encrypted message to control the element 184. Rolling encryption keys ensure that each command sent to an element uses a different encryption key and thus appears to be completely uncorrelated with any other command.

Figure 15:
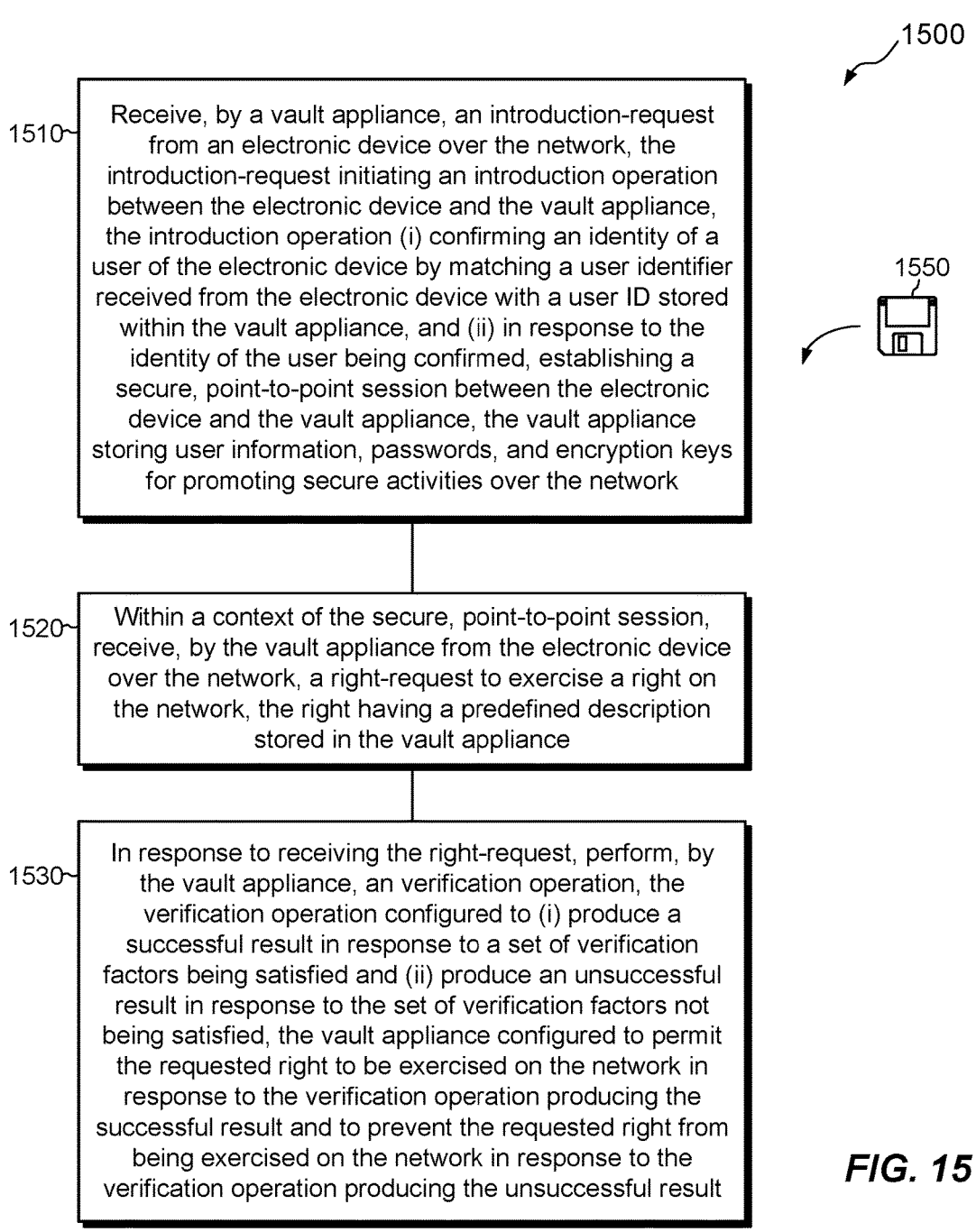
FIG. 15 is a flowchart of an example method for performing activities over a network using the vault appliance of FIG. 1.

FIG. 15 shows an example method 1500 that may be carried out in connection with the environment 100. The method 1500 is typically performed, for example, by the software constructs described in connection with FIG. 1, which reside in the memory 150 and 160 of the vault appliance 140 and are run by the set of processing units 144.

The various acts of method 1500 may be ordered in any suitable way. Accordingly, embodiments may be constructed in which acts are performed in orders different from that illustrated, which may include performing some acts simultaneously.

At 1510, an introduction-request 190 is received by a vault appliance 140 from an electronic device 110 over a network 180 and/or 220. The introduction—request 190—request initiates an introduction operation 190*a* between the electronic device 110 and the vault appliance 140, the introduction operation 190 (i) confirming an identity of a user (e.g., 102) of the electronic device 110 by matching a user identifier (UPID) received from the electronic device 110 with a user ID (one of 162*a*) stored within the vault appliance 140, and (ii) in response to the identity of the user 102 being confirmed, establishing a secure, point-to-point session 192 between the electronic device 110 and the vault appliance 140. The vault appliance 140 stores user information 162*c*, passwords 162*e*, and encryption keys 162*d* for promoting secure activities over the network.

At 1520, within a context of the secure, point-to-point session 192, the vault appliance 140 receives, from the electronic device 110 over the network 180/220, a right-request 194 to exercise a right on the network, the right having a predefined description 162*f* stored in the vault appliance 140.

At 1530, in response to receiving the right-request 194, the vault appliance 140 performs a verification operation 194*a*, the verification operation 194*a* is configured to (i) produce a successful result 850 in response to a set of verification factors 710 being satisfied and (ii) produce an unsuccessful result 860 in response to the set of verification factors 710 not being satisfied, the vault appliance 140 configured to permit the requested right to be exercised on the network in response to the verification operation 194*a* producing the successful result 850 and to prevent the requested right from being exercised on the network in response to the verification 194*a* operation producing the unsuccessful result 860.

An improved technique has been described for promoting network security. The technique employs a vault appliance 140 that serves as a local security hub for users and their devices. The vault appliance 140 stores user information and definitions of rights, i.e., activities that user devices may perform, and securely dispatches those rights in response to right-requests and subject to user and/or device verification.

The vault appliance 140 and vault network 200 offer many advantages over conventional systems for providing network security. For example, the vault network 200 is self-defending in the sense that any component of the vault network 200 can be removed from the network for violating protocols. It is not possible for a user to cause a legitimate vault 140 to violate vault network protocols. Hence, if a vault is detected to have violated vault network protocols, that vault is assumed to be altered and is immediately removed from the vault network 200. Further, the owner of the vault may be held responsible and removed from the vault network as well.

Protocols in the vault network share a common feature that they are all involve transactions that are expected to be completed with a purpose. This means that if one vault contacts another vault, the initiating vault is expected to make a valid request and to complete the transaction.

There are classes of protocol violations for which the vault network servers should not immediately eject an offending vault. Instead, these types of violations may be logged and a vault may be removed from the vault network 200 only after a pattern of malicious behavior is detected with certainty. For example, to filter out premature terminations of transactions due to user or device interaction, a vault 140 is required to inform the vault network servers of such termination and give a reason. To filter out connection or network problems, a new transaction cannot be started by a vault until the previous transaction has completed. This implies that violations of incompletion are not immediately detectable, but rather are detected only after the vault attempts to start a new transaction. To filter out state loss in the vault that could occur with power loss, the vault is required to inform the vault network servers when it reboots.

In an example, the vault network 200 also defends against a second class of violations—behavioral violations. A behavioral violation is one that does not violate a protocol but instead violates a core principal of the vault network 200. Unlike protocol violations, where removal from the vault network may be immediate, behavioral violations require a pattern a behavior before the offending user is removed. When a vault encounters a behavioral violation, that vault reports the violation to a central server. The central server looks for patterns of repeated bad behavior from users and deals with them appropriately. Examples of behavioral violations include:

Requesting access to a right that does not exist. The most common form of this may be the content right, where the content right has been removed but the encrypted data still exists somewhere;

Requesting access to a right that the user is not authorized to access. Same as above;

Connecting to a vault without making a request;

Requesting the home vault of a user from the vault network servers without contacting that home vault in the same session; and Requesting the address and public key of a vault from the core servers without contacting the vault in the same session.

The behavioral violations are flagged because either someone is trying to gain insight into another person's rights or that person is attempting to gather information about the vault network itself. The vault network is preferably closed, and no third party is allowed to make a map of the vaults contained within the vault network. That is the job of the vault network servers. It is also against vault network principles for a third party to create a user directory. These are the driving forces behind the behavioral violations. Behavioral violations are caught via logging.

As the vault network is closed, only members or components of the vault network will get a response from the vault network servers or vaults. The servers are generally the only components of the vault network with well-known addresses available on DNS (Directory Name System) servers. The two above facts make it impossible for a non-member of the vault network to create a map or directory of the vault network and/or its users.

The vault network securely logs all transactions. For a given request, the component of the vault network that provides the service and is responsible for defending the requestor is the component that performs the logging. Thus, the vault logs all transactions associated with the execution and management of rights, as well as all modifications to the user profiles of all members on the vault. The servers log all requests from the users and vaults for the services they provide.

Logging of transactions provides benefits to all participants. Users protect themselves against fraudulent claims of action. Rights represent things of value. Hence, if someone is accused of using the thing of value, they can prove that they did not, or in cases of misuse, exactly how they used the right. The vault network protects itself against bad behavior of users. Also, law enforcement can use the logs to help with legitimate law enforcement concerns. The communication right creates an encrypted session through which two end users can communicate. Without the logs, these communications would be hidden and hence enable nefarious people could perform nefarious deeds. Any right that is executed during the commitment of crime is logged, aiding law enforcement. Law enforcement may also subpoena the owner of a vault for the vault and vault recovery key 186 to obtain access to the content of logged communications.

In a traditional content protection system, the same system holds both the address of the content as well as the key for that content. Such systems have to be able to address the content before they can associate the key with the data; thus, they are inherently limited to access of content in the addressable domain. For encrypted data to exist on arbitrary systems in a uniformly available manner, the component storing the encryption keys cannot track the location of the encrypted data. If one were to confine data to a specific address type the problem could be solved, but even the most generic of address types cannot address all data. If, however, a specific user stores all of his encryption keys for data that he owns in one known place, the problem of associating encryption keys with encrypted data can be solved. In the vault network, each user has a UPID, which is a globally unique user ID. Each user can, through his vault, give a unique content identifier to each of that user's pieces of content. This content identifier is unique for the user. The combination of the globally-unique user identifier and user-unique content identifier forms a globally unique content identifier. Therefore, any application that chooses to access a vault network-encrypted file simply needs to look into the header to find unique identifier and then request access from the file owner's home vault. The UNS 240 maps UPIDs to home vaults. Hence, any legitimate member of the vault network may ask for the home vault of the owner. Note that only members of the vault network are permitted to contact the servers. A content right protects the encrypted file so only those authorized users as specified by the owner may access the file. Further, it is a violation of vault protocols to ask a vault for permission to access a file to which one does not have permission to access. A user who does this too many times in the vault network can be removed from the vault network altogether.

The basic model of the vault network for encrypted data is that the encrypted data may exist anywhere in any form without restriction. The decrypted data must however remain on approved vault network hardware and use approved vault network applications. This is to insure that the encryption keys remain safe and deleted after use on the devices that utilize them. It is the job of the applications to track and manage the data in a manner consistent with the requirements of the application. The number of permitted copies of the data is controlled from within the content right. The content right does this by limiting the number of users it sends the encryption keys to. Users must request and release access to the encryption keys while at no time storing encryption in non-volatile memory keys for later use. This is done because the encrypted data is not guaranteed to be in the scope of the vault network and hence an arbitrary number of copies of the encrypted data could be made.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 1550 in FIG. 15). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of performing activities over a network, the method comprising:
receiving, by a vault appliance, an introduction-request from an electronic device over the network, the introduction-request initiating an introduction operation between the electronic device and the vault appliance, the introduction operation (i) confirming an identity of a user of the electronic device by matching a user identifier received from the electronic device with a user ID stored within the vault appliance, and (ii) in response to the identity of the user being confirmed, establishing a secure, point-to-point session between the electronic device and the vault appliance, the vault appliance storing user information, passwords, and encryption keys for promoting secure activities over the network;
within a context of the secure, point-to-point session, receiving, by the vault appliance from the electronic device over the network, a right-request to exercise a right on the network, the right having a predefined description stored in the vault appliance; and in response to receiving the right-request, performing, by the vault appliance, a verification operation, the verification operation configured to (i) produce a successful result in response to a set of verification factors being satisfied and (ii) produce an unsuccessful result in response to the set of verification factors not being satisfied, the vault appliance configured to permit the requested right to be exercised on the network in response to the verification operation producing the successful result and to prevent the requested right from being exercised on the network in response to the verification operation producing the unsuccessful result, wherein the vault appliance includes a set of motion detectors, and wherein the method further comprises (i) monitoring the set of motion detectors to detect movement of the vault appliance, and (ii) in response to detected movement of the vault appliance exceeding a predetermined distance threshold, rendering the vault appliance inoperative for responding to right-requests by deleting a set of encryption keys stored within the vault appliance.

2. The method of claim 1, wherein the vault appliance stores multiple predefined descriptions for respective rights, each predefined description including a respective secret required for exercising the respective right on the network.

3. The method of claim 2, wherein the right pertains to one of (i) a content right to access content over the network, (ii) a communication right to conduct communication with another party over the network, and (iii) an action right to perform an action on a component connected to the network.

4. The method of claim 3, wherein the method further comprises the vault appliance storing (i) a description of a content right to access a content element over the network and (ii) a key for decrypting the content element.

5. The method of claim 3, wherein the method further comprises the vault appliance storing (i) a description of a communication right to conduct communication with another party over the network and (ii) a password for establishing communication with the other party.

6. The method of claim 3, wherein the method further comprises the vault appliance storing (i) a description of an action right to perform an action on a component connected to the network and (ii) a password for accessing the component upon which the action is to be performed.

7. The method of claim 3,
wherein the vault appliance is a home vault of the user,
wherein the home vault includes persistent memory that stores the user ID of the user and multiple secrets required to exercise respective rights, and
wherein the user is registered with the electronic device and the electronic device is registered with the home vault, such that the home vault recognizes the electronic device and the user when communicating with the electronic device.

8. The method of claim 7,
wherein the home vault is connected to a local network that extends over a limited geographical region within which the home vault is disposed,
wherein, when performing the verification operation, the home vault increases a verification strength of the right-request in response to detecting that the electronic device, which has been registered with the home vault, is also connected to the local network, and
wherein increasing the verification strength increases a likelihood that the verification operation produces the successful result.

9. The method of claim 8,
wherein the home vault stores an identity of each of a set of tag devices that the home vault associates with the user, and
wherein, when performing the verification operation, the home vault increases the verification strength of the right-request in response to the home vault detecting that at least one of the set of tag devices is present within the local network.

10. The method of claim 8,
wherein the home vault stores an identity of a tag device that the home vault associates with the user, and
wherein the verification operation is further configured to produce the unsuccessful result in response to the home vault failing to detect that the tag device is present within the local network.

11. The method of claim 7,
wherein each of the set of verification factors produces a magnitude that indicates how well that verification factor is satisfied by circumstances surrounding the right-request,
wherein the set of verification factors includes (i) a first subset of verification factors that are mandatory and (ii) a second subset of verification factors that are not mandatory, and
wherein the verification operation produces the successful result in response to each of the first subset of verification factors being met explicitly and a sum of magnitudes across the set of verification factors exceeding a predetermined threshold.

12. The method of claim 4,
wherein the home vault is operatively coupled to a set of service modules, each of the set of service modules being (i) a registered device with the home vault and (ii) constructed and arranged to control respective equipment, the equipment including any of (a) a gaming system, (b) a home or office security component, (c) an HVAC (Heating, Ventilation, and Air Conditioning) component, (d) a home entertainment component, and (e) a smart home or office component.

13. The method of claim 1, wherein the method further comprises, after the vault appliance has been rendered inoperative, restoring operation of the vault appliance by (i) electronically accessing contents from a master-key device that has been connected to the vault appliance, (ii) reading into the vault appliance a duplicate set of encryption keys from the master-key device, and (iii) resuming operation of the vault appliance for responding to right-requests using the duplicate set of encryption keys.

14. The method of claim 7,
wherein the home vault belongs to a vault network that includes (i) multiple vault appliances disposed in respective local networks each having its own respective geographical extent and (ii) a set of servers on the Internet that store identities of registered vault appliances, registered users, and registered electronic devices, and
wherein the method further comprises the home vault communicating with another vault appliance over the vault network.

15. The method of claim 14, wherein the set of servers includes a vault name server (VNS) that stores identities of multiple registered vault appliances on the vault network, and wherein, prior to the home vault communicating with the other vault appliance, the method further comprises the home vault verifying its identity to the VNS by:
establishing an encrypted session with the VNS;
receiving, from the VNS over the encrypted session, a first asymmetric encryption key;
encrypting, using the first asymmetric encryption key, a first identifier stored in a first register of the home vault; and
sending the encrypted first identifier to the VNS over the encrypted session, to enable the VNS to decrypt the first identifier, a verification of the home vault to the VNS at least partially succeeding in response to the decrypted first identifier matching an expected value maintained by the VNS.

16. The method of claim 15, wherein the verification of the home vault to the VNS further includes:
sending a second asymmetric encryption key to the VNS over the encrypted session;
receiving a value from VNS, the value encrypted using the second asymmetric encryption key;
decrypting the value using a decryption key that decrypts ciphertext that was encrypted using the second asymmetric encryption key; and
comparing the decrypted value with a second identifier stored in a second register of the home vault, verification with the VNS further succeeding in response to the decrypted value matching the second identifier.

17. The method of claim 14, wherein the set of servers includes a vault name server (VNS) that stores a network address and an associated public key for each of multiple registered vault appliances on the vault network, and wherein, prior to the home vault communicating with the other vault appliance, the method further comprises the home vault verifying to the VNS by:
receiving a message from the VNS, the message encrypted using a public key stored in the VNS for the home vault;
applying a private key to decrypt the received message; and
sending the decrypted message back to the VNS to enable the VNS to compare the decrypted message to an expected value.

18. The method of claim 14, wherein the set of servers further includes a UPID (User Public Identifier) server that associates user IDs with respective home vaults, and wherein the method further comprises:
receiving, by the home vault from a second electronic device operating within the local network of the home vault, a second introduction-request, the second introduction-request specifying a user ID of a second user;
querying, over the vault network, the UPID server to identify a home vault of the second user; and
contacting, by the home vault, the home vault of the second user to enable the second electronic device to establish a secure, point-to-point connection with the home vault of the second user.

19. The method of claim 14, further comprising:
receiving, by the home vault, a right-request from the electronic device to establish communication between the electronic device and a remote device registered with a remote vault;
after the remote vault has received a request to communicate and has performed a look-up of a network address of the home vault on the set of servers, receiving, by the home vault from the remote vault, a confirmation request, the confirmation request directed to the home vault at the network address and requesting confirmation that the home vault has a communication request pending; and
in response to the home vault confirming that it has a communication request pending, providing a set of session keys to the electronic device and the remote device to enable the electronic device and the remote device to communicate securely using the set of session keys.

20. A vault appliance, comprising control circuitry that includes a set of processing units coupled to memory, the control circuitry constructed and arranged to:
receive, by a vault appliance, an introduction-request from an electronic device over a network, the introduction-request configured to initiate an introduction operation between the electronic device and the vault appliance, the introduction operation configured to (i) confirm an identity of a user of the electronic device by matching a user identifier received from the electronic device with a user ID stored within the vault appliance, and (ii) in response to the identity of the user being confirmed, establish a secure, point-to-point session between the electronic device and the vault appliance, the vault appliance storing user information, passwords, and encryption keys for promoting secure activities over the network;
within a context of the secure, point-to-point session, receive, by the vault appliance from the electronic device over the network, a right-request to exercise a right on the network, the right having a predefined description stored in the vault appliance; and
perform, by the vault appliance, a verification operation in response to receiving the right-request, the verification operation configured to (i) produce a successful result in response to a set of verification factors being satisfied and (ii) produce an unsuccessful result in response to the set of verification factors not being satisfied, the vault appliance configured to permit the requested right to be exercised on the network in response to the verification operation producing the successful result and to prevent the requested right from being exercised on the network in response to the verification operation producing the unsuccessful result,
wherein the vault appliance includes a set of motion detectors, and wherein the control circuitry is further constructed and arranged to (i) monitor the set of motion detectors to detect movement of the vault appliance, and (ii) in response to detected movement of the vault appliance exceeding a predetermined distance threshold, render the vault appliance inoperative for responding to right-requests by deleting a set of encryption keys stored within the vault appliance.

21. A computer program product including a set of non-transitory, computer-readable media having instructions which, when executed by control circuitry of a vault appliance, cause the control circuitry to perform a method for performing activities over a network, the method comprising:
receiving, by a vault appliance, an introduction-request from an electronic device over the network, the introduction-request initiating an introduction operation between the electronic device and the vault appliance, the introduction operation (i) confirming an identity of a user of the electronic device by matching a user identifier received from the electronic device with a user ID stored within the vault appliance, and (ii) in response to the identity of the user being confirmed, establishing a secure, point-to-point session between the electronic device and the vault appliance, the vault appliance storing user information, passwords, and encryption keys for promoting secure activities over the network;

within a context of the secure, point-to-point session, receiving, by the vault appliance from the electronic device over the network, a right-request to exercise a right on the network, the right having a predefined description stored in the vault appliance; and in response to receiving the right-request, performing, by the vault appliance, a verification operation, the verification operation configured to (i) produce a successful result in response to a set of verification factors being satisfied and (ii) produce an unsuccessful result in response to the set of verification factors not being satisfied, the vault appliance configured to permit the requested right to be exercised on the network in response to the verification operation producing the successful result and to prevent the requested right from being exercised on the network in response to the verification operation producing the unsuccessful result, wherein the vault appliance includes a set of motion detectors, and wherein the method further comprises (i) monitoring the set of motion detectors to detect movement of the vault appliance, and (ii) in response to detected movement of the vault appliance exceeding a predetermined distance threshold, rendering the vault appliance inoperative for responding to right-requests by deleting a set of encryption keys stored within the vault appliance.

* * * * *